(12) United States Patent
Ruhland et al.

(10) Patent No.: US 11,548,747 B2
(45) Date of Patent: *Jan. 10, 2023

(54) RELEASE LINER REMOVAL APPARATUS

(71) Applicant: BHS Corrugated Maschinen- und Anlagenbau GmbH, Weiherhammer (DE)

(72) Inventors: Karl Ruhland, Pfreimd (DE); Alfons Gnan, Vilseck (DE); Norbert Städele, Parkstein (DE)

(*) Notice: Subject to any disclaimer, the term of this patent is extended or adjusted under 35 U.S.C. 154(b) by 334 days.

This patent is subject to a terminal disclaimer.

(21) Appl. No.: 16/783,362

(22) Filed: Feb. 6, 2020

(65) Prior Publication Data

US 2020/0255246 A1    Aug. 13, 2020

(30) Foreign Application Priority Data

Feb. 7, 2019  (DE) ..................... 10 2019 201 592.1
Mar. 19, 2019  (DE) ..................... 10 2019 203 744.5

(51) Int. Cl.
| | | |
|---|---|---|
| *B31F 5/06* | (2006.01) | |
| *B65H 19/10* | (2006.01) | |
| *B65H 19/18* | (2006.01) | |
| *B65H 18/08* | (2006.01) | |
| *B65H 23/10* | (2006.01) | |
| *C09J 7/20* | (2018.01) | |
| *C09J 7/40* | (2018.01) | |

(52) U.S. Cl.
CPC ............. *B65H 19/102* (2013.01); *B31F 5/06* (2013.01); *B65H 18/08* (2013.01); *B65H 19/18* (2013.01); *B65H 23/10* (2013.01); *B65H 23/105* (2013.01); *C09J 7/20* (2018.01); *C09J 7/405* (2018.01); *B65H 2301/41766* (2013.01); *B65H 2301/4607* (2013.01); *B65H 2301/4631* (2013.01); *B65H 2301/46078* (2013.01); *C09J 2203/342* (2013.01); *C09J 2301/124* (2020.08); *Y10T 428/14* (2015.01)

(58) Field of Classification Search
CPC ...... B65H 19/18; B65H 19/102; B65H 23/10; B65H 2301/41766; B65H 2301/46078; B31F 5/06
See application file for complete search history.

(56) References Cited

U.S. PATENT DOCUMENTS

| | | |
|---|---|---|
| 4,878,982 A | 11/1989 | Ogata et al. |
| 5,400,940 A | 3/1995 | Sato et al. |

(Continued)

FOREIGN PATENT DOCUMENTS

| | | | |
|---|---|---|---|
| DE | 19724123 A1 | 12/1998 | |
| DE | 10 2015 208 136 A1 | 11/2016 | |

(Continued)

*Primary Examiner* — Sang K Kim
(74) *Attorney, Agent, or Firm* — McGlew and Tuttle, P.C.

(57) ABSTRACT

The invention relates to a release liner removal apparatus, comprising at least one release liner removal device for removing at least one release liner from at least one adhesive piece arranged on a material web, at least one support body which supports the at least one release liner removal device, and at least one guide body which is arranged adjacent to the at least one release liner removal device at least during the removal of the at least one release liner and which serves for guiding the material web.

26 Claims, 16 Drawing Sheets

(56) References Cited

U.S. PATENT DOCUMENTS

| | | | | |
|---|---|---|---|---|
| 5,431,767 | A | * | 7/1995 | Koza ............... B65H 35/0013 |
| | | | | 156/577 |
| RE38,356 | E | | 12/2003 | Weirauch et al. |
| 6,808,581 | B2 | * | 10/2004 | Kuta ................ B65H 19/105 |
| | | | | 242/555.3 |
| 6,814,123 | B2 | * | 11/2004 | Erickson ........... B65H 19/102 |
| | | | | 242/910 |
| 2003/0080235 | A1 | | 5/2003 | Sato et al. |
| 2003/0098131 | A1 | | 5/2003 | Hayasaka et al. |
| 2004/0045658 | A1 | | 3/2004 | Bean et al. |
| 2006/0076449 | A1 | | 4/2006 | Stitz et al. |
| 2013/0183473 | A1 | | 7/2013 | Lanfranconi |
| 2016/0244290 | A1 | * | 8/2016 | De Marco ......... B65H 19/1852 |
| 2018/0257403 | A1 | | 9/2018 | Yasuda et al. |
| 2018/0362281 | A1 | | 12/2018 | Pasqualoni |
| 2020/0255245 | A1 | * | 8/2020 | Ruh .................. B65H 18/08 |

FOREIGN PATENT DOCUMENTS

| | | |
|---|---|---|
| DE | 10 2015 214 193 A1 | 2/2017 |
| DE | 102016200581 A1 | 7/2017 |
| DE | 10 2016 205 059 A1 | 9/2017 |
| EP | 0 181 280 A1 | 5/1986 |
| EP | 0274088 A2 | 7/1988 |
| EP | 0349350 A2 | 1/1990 |
| EP | 0 609 680 A2 | 8/1994 |
| EP | 0755890 A1 | 1/1997 |
| EP | 1149788 A2 | 10/2001 |
| EP | 1177997 A1 | 2/2002 |
| EP | 1645534 A1 | 4/2006 |
| EP | 1654534 A1 | 5/2006 |
| EP | 1 752 402 A1 | 2/2007 |
| EP | 1 752 403 A1 | 2/2007 |
| EP | 1752402 A1 | 2/2007 |
| EP | 1752403 A1 | 2/2007 |
| EP | 2612832 A2 | 7/2013 |
| EP | 3459884 A1 | 3/2019 |
| JP | S63 201727 A | 8/1988 |
| JP | H10139228 A | 5/1998 |
| WO | 2003/008311 A1 | 1/2003 |
| WO | 2005017518 A1 | 2/2005 |
| WO | 2016/173853 A1 | 11/2016 |

* cited by examiner

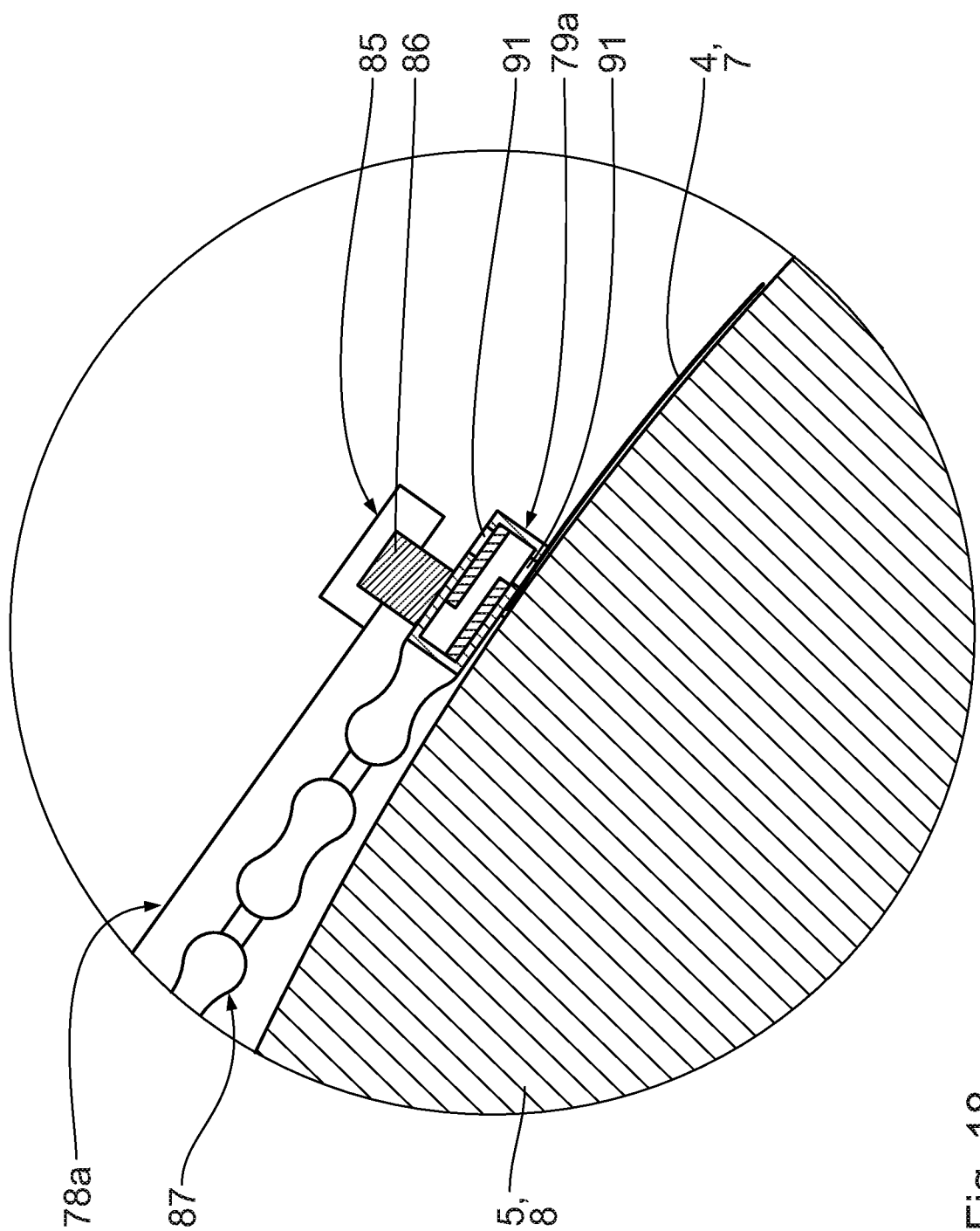

RELEASE LINER REMOVAL APPARATUS

CROSS-REFERENCES TO RELATED APPLICATIONS

This application claims the priority of German Patent Application, Serial No. DE 10 2019 201 592.1, filed Feb. 7, 2019, as well as the priority of German Patent Application, Serial No. DE 10 2019 203 744.5, filed Mar. 19, 2019, pursuant to 35 U.S.C. 119(a)-(d), the content of which is incorporated herein by reference in its entirety as if fully set forth herein.

FIELD OF THE INVENTION

The invention is directed to a release liner removal apparatus. The invention furthermore relates to a material web working/processing arrangement, in particular material web dispensing arrangement, in particular material web unrolling arrangement, in particular material web splicing arrangement, having at least one such release liner removal apparatus and preferably at least one material web drawing-in apparatus.

The invention also relates to a plant having at least one material web working/processing arrangement, in particular material web dispensing arrangement, in particular material web unrolling arrangement, in particular material web splicing arrangement.

The invention is furthermore directed to a method for removing at least one release liner. The invention is furthermore directed to an adhesive piece.

The invention is furthermore directed to a material web working/processing arrangement having a material web connecting/preparation unit. The invention furthermore relates to a further plant.

BACKGROUND OF THE INVENTION

From the prior art, it is known from prior public use for material webs to be introduced into working/processing arrangements. This is generally performed manually or by hand. Furthermore, the prior art discusses the removal, manually or by hand, of release liners of adhesive pieces which are adhesive on both sides and which are attached to material webs in order to connect these to one another. This is often associated with not inconsiderable expenditure of time, and is often performed without particular care.

SUMMARY OF THE INVENTION

The present invention is therefore based on an object of eliminating the problems of the prior art. The invention is based on the object of providing a release liner removal apparatus which is capable of operating in a particularly functionally reliable and efficient manner. It is furthermore sought to provide a corresponding material web working/processing arrangement, in particular material web dispensing arrangement, in particular material web unrolling arrangement, in particular material web splicing arrangement, having at least one such release liner removal device.

It is furthermore sought to create a corresponding plant having at least one material web working/processing arrangement, in particular material web dispensing arrangement, in particular material web unrolling arrangement, in particular material web splicing arrangement.

It is furthermore sought to provide a corresponding method for removing at least one release liner. It is furthermore sought to provide a corresponding adhesive piece.

It is furthermore sought to create a material web working/processing arrangement and a plant, which are particularly efficient.

Said object is achieved according to the invention by a release liner removal apparatus, comprising at least one release liner removal device for removing at least one release liner from at least one adhesive piece arranged on a material web, at least one support body which supports the at least one release liner removal device, and at least one guide body which is arranged adjacent to the at least one release liner removal device at least during the removal of the at least one release liner and which serves for guiding the material web.

Said object is further achieved by a material web working/processing arrangement, in particular material web dispensing arrangement, in particular material web unrolling arrangement, in particular material web splicing arrangement, having at least one release liner removal apparatus according to the invention.

Said object is further achieved by a plant having at least one material web working/processing arrangement, in particular material web dispensing arrangement, in particular material web unrolling arrangement, in particular material web splicing arrangement, and having at least one material roll preparation arrangement for preparing a material roll carrying the material web to be drawn in.

Said object is further achieved by a method for removing at least one release liner, comprising removing at least one release liner from at least one adhesive piece arranged on a material web by means of at least one release liner removal device which is supported by at least one support body, and guiding the material web by means of at least one guide body which is arranged adjacent to the at least one release liner removal device at least during the removal of the at least one release liner.

Said object is further achieved by an adhesive piece for adhesive connection of material webs, having an adhesive compound carrier which bears adhesive compound on two opposite sides, and having at least one release liner which originally covers, at least in regions, the adhesive compound carrier and also the adhesive compound present there, protrudes at least in regions beyond the adhesive compound carrier, and is removable by the release liner removal apparatus according to the invention.

Said object is further achieved by a material web working/processing arrangement, in particular material web dispensing arrangement, in particular material web unrolling arrangement, in particular material web splicing arrangement, wherein said material web working/processing arrangement is designed such that a connection between one finite material web and a further finite material web so as to form a continuous material web is preparable in automated fashion owing to a defined initial situation of the material web to be drawn in or of an end thereof.

Said object is further achieved by a plant having at least one material roll preparation arrangement for bringing a material roll carrying a material web to be drawn in into a defined initial situation, and having at least one material web working/processing arrangement, in particular material web dispensing arrangement, in particular material web unrolling arrangement, in particular material web splicing arrangement, which material web working/processing arrangement is capable, owing to the defined initial situation of the material roll, of receiving the material roll in automated fashion and preferably receiving the material web in automated fashion and/or preparing the material web in automated fashion.

The essence of the invention lies in simplifying the handling of material webs or material rolls for working/processing.

The release liner removal apparatus is in particular capable of removing, preferably in automated fashion, the at least one release liner of the at least one adhesive (strip) piece, which is in particular adhesive on both sides. The at least one release liner is then preferably disposed of. The at least one release liner preferably originally covers an adhesive compound carrier which bears adhesive compound preferably on both sides.

The release liner expediently protrudes laterally in relation to the adhesive compound carrier in a longitudinal direction and/or transverse direction at least in regions, and is thus particularly easily removable from the adhesive compound carrier.

The material web splicing arrangement expediently comprises a connecting apparatus for connecting a finite first material web and a finite second material web to one another to form an endless material web. The connecting apparatus preferably comprises a guide and a first preparation device with a first transport drum and a second preparation device with a second transport drum. It is advantageous if the connecting apparatus furthermore comprises a first connecting device for connecting the finite material webs to form the endless material web and a second connecting device for connecting the finite material webs to form the endless material web. The connecting apparatus furthermore preferably has a displaceable table device for interaction with the preparation devices and the connecting devices.

The at least one material roll preparation arrangement is in particular capable of preparing the material roll for the further working/processing. The preparation of the material roll comprises for example an unpacking or exposing thereof, removal and/or destruction of at least one fixing which fixes a free material web portion for the purposes of preventing an unwinding from the material roll, removal of at least one strapping element, removal of a damaged material web portion from the material roll, generation of a defined end contour or edge for the further processing on the material web, application of at least one adhesive piece to the material web, fixing of an end-side material web portion to the material roll and/or orientation of the material roll and/or of the material web.

The material web working/processing arrangement and the at least one material roll preparation arrangement may be arranged adjacent to or spaced apart from one another. The at least one material roll preparation arrangement is preferably arranged externally in relation to the material web working/processing arrangement.

The material web working/processing arrangement is for example capable of preparing or effecting an, in particular adhesive, connection between the finite material webs in automated or autonomous fashion, in particular fully automated fashion. The preparation of the connection comprises for example a drawing-in of the material web, suitable positioning of the material web, an application of at least one adhesive piece to the material web and/or a removal of at least one release liner from the at least one adhesive piece. The, in particular exactly, defined initial situation of the material web to be drawn in or of the end thereof or of the material roll carrying said material web is for example achievable by means of a, for example external, material roll preparation arrangement.

The material web working/processing arrangement is in particular capable of receiving the material web in automated or autonomous fashion, in particular fully automated fashion. Said material web working/processing arrangement is in particular capable of drawing in the material web in automated or autonomous fashion, in particular fully automated fashion, and/or preparing said material web for the further working/processing, such as for a connection to a further material web to form an endless material web, in automated or autonomous fashion, in particular fully automated fashion.

The statements made relating to the release liner removal apparatus, comprising at least one release liner removal device for removing at least one release liner from at least one adhesive piece arranged on a material web, at least one support body which supports the at least one release liner removal device, and at least one guide body which is arranged adjacent to the at least one release liner removal device at least during the removal of the at least one release liner and which serves for guiding the material web apply substantially analogously to the method for removing at least one release liner, comprising removing at least one release liner from at least one adhesive piece arranged on a material web by means of at least one release liner removal device which is supported by at least one support body, and guiding the material web by means of at least one guide body which is arranged adjacent to the at least one release liner removal device at least during the removal of the at least one release liner.

The material web working/processing arrangement is for example capable of drawing in a material web in automated or autonomous fashion, in particular fully automated fashion. The, in particular exactly, defined initial situation of the material web to be drawn in or of the end/start thereof or of the material roll carrying said material web is for example achievable by means of a, for example external, material roll preparation arrangement. The above statements relating to this also apply here.

The material web for working or processing can be drawn into the material web working/processing arrangement, in particular material web dispensing arrangement, in particular material web unrolling arrangement, in particular material web splicing arrangement, by means of the at least one material web drawing-in apparatus, which is particularly efficient. The material web splicing arrangement is expediently capable of connecting a finite material web which is nearing its end to a new finite material web, so as to form an endless material web. The material web drawing-in apparatus preferably facilitates the threading-in or introduction of the material web into the material web working/processing arrangement. Said material web drawing-in apparatus is of assistance for example during the setting in operation of the material web working/processing arrangement.

The at least one material roll preparation arrangement is preferably capable of bringing the material roll carrying the material web to be drawn in, and thus preferably also the comprised material web, in particular the free end thereof, into a defined initial situation or oriented position.

A defined initial situation of the material web or material roll is to be understood here in particular to mean a situation or position of the material web or material roll which is known to the material web working/processing arrangement and which expediently enables the latter to receive the material roll or the material web in automated or autonomous fashion, in particular fully automated fashion, or makes it possible for the material web to be introduced in automated or autonomous fashion, in particular fully automated fashion. In the defined initial situation, in the case of a material roll which is then received, it is for example the case that an end/start of the material web is oriented relative to the material web working/processing arrangement such that said end/start can be discovered by the material web working/processing arrangement. In the defined initial situation, the material roll, in particular in its circumferential direction about its central or longitudinal axis, is oriented in relation to the material web working/processing arrangement.

The at least one release liner removal device and the at least one guide body are displaceable, in particular slidable and/or pivotable, relative to one another between a mutually adjacent release liner removal position, for the removing the at least one release liner from the at least one adhesive piece, and an inactive rest position.

The at least one release liner removal device being designed as a negative-pressure body, in particular negative-pressure drum, is preferably displaceable, in particular slidable and/or pivotable. It is preferably connected in terms of flow to a negative-pressure source, such as vacuum pump.

The at least one guide body being designed as a negative-pressure body, in particular negative-pressure drum is preferably displaceable, in particular slidable and/or pivotable. It is preferably connected in terms of flow to a negative-pressure source, such as vacuum pump.

A material web drawing-in apparatus for drawing in a material web preferably comprises
 a) at least one material web holding device for holding the material web to be drawn in,
 b) at least one guide for guiding the at least one material web holding device from at least one material web drawing-in point to at least one material web transfer point, and
 c) at least one drawing-in drive which is connected to the at least one material web holding device and which serves for displacing the at least one material web holding device along the at least one guide while drawing in the material web to be drawn in in the direction of the at least one material web transfer point.

The material web drawing-in apparatus is capable of drawing in a material web, in particular in a guided manner Here, the at least one drawing-in drive exerts a corresponding force, in particular tension force, in particular on the material web. It is expedient if the material web to be drawn in is transported or conveyed in a drawing-in direction during the drawing-in process. The drawing-in direction is preferably oriented in a longitudinal direction of the material web to be drawn in.

It is expedient if the material web is composed of cardboard, paper or the like. The material web is expediently finite. It is preferably in single-layer form.

The at least one material web holding device is in particular capable of holding the material web securely, for example by positive locking, non-positive locking and/or cohesion, during the drawing-in process. Said material web holding device preferably extends over the entire width of the material web to be drawn in and/or perpendicular to the transport direction or drawing-in direction thereof.

The at least one guide expediently comprises guide devices, which in turn are formed by guide elements which are arranged in pairs and which are situated opposite one another and which are in particular arranged or configured symmetrically. The guide elements arranged adjacent to one another are for example integrally connected to one another at least in regions, or formed separately. It is expedient if each guide device or each guide element is rigid. The at least one guide runs preferably laterally adjacent to the material web to be drawn in, or adjacent thereto in the transverse direction of the material web to be drawn in. The at least one guide runs in particular adjacent to the material web to be drawn in laterally on the outside, or adjacent thereto laterally on the outside in the transverse direction of the material web to be drawn in. Said at least one guide serves for directly or indirectly guiding the material web to be drawn in.

It is expedient if the at least one guide has at least one switch which in particular permits a change between guide paths for the material web to be drawn in and the at least one material web holding device. The at least one material web holding device is thus positionable in a particularly functionally reliable manner at a corresponding point, such as material web drawing-in point.

The at least one drawing-in drive is preferably a hydraulic, electric or pneumatic drive. It is preferably designed as a linear drive or rotary drive. It is advantageous if the at least one drawing-in drive is directly or indirectly connected to the at least one material web holding device at least during a material web drawing-in process.

The at least one material web holding device and the at least one drawing-in drive may be directly or indirectly connected to one another (in terms of drive).

The material web drawing-in apparatus preferably comprises at least one coupling element which is arranged between the at least one drawing-in drive and the at least one material web holding device. The at least one coupling element is preferably of elongate form. It is expedient if the at least one coupling element is capable of transmitting a force, in particular tensile force, and movement to the material web to be drawn in. It is advantageous if the at least one coupling element is deflectable perpendicularly with respect to its longitudinal extent. The at least one coupling element is preferably designed as a chain, cable, wire, strip, belt or the like.

It is expedient if the at least one drawing-in drive is directly or indirectly connected in terms of drive to the at least one coupling element. The at least one drawing-in drive is connected in terms of drive to the at least one coupling element preferably by means of at least one driveable, in particular rotationally driveable, drive element, such as drive wheel. If the at least one coupling element is designed as a chain, the at least one drawing-in drive is expediently connected in terms of drive to the at least one chain by means of at least one drive toothed wheel. The at least one drive toothed wheel is preferably then in engagement with the at least one chain. It is expedient if, along the at least one guide, multiple drive elements or drawing-in drives are connected in terms of drive to the at least one coupling element.

It is advantageous if the at least one material web holding device is capable of receiving the material web to be drawn in in automated fashion. The at least one material web holding device is particularly efficient. It in particular requires no operator, and operates in in particular fully automated or autonomous fashion.

The material web drawing-in apparatus preferably has at least one activation apparatus for activating the at least one material web holding device. The at least one activation device is capable of activating the at least one material web holding device and bringing it into a material web holding position. The at least one activation device is thus capable of triggering the holding of the material web to be drawn in at the at least one material web holding device. It is expedient if, for this purpose, the at least one activation device and the at least one material web holding device have a connection to one another, such as a drive connection or signal connection.

The material web to be drawn in, preferably a material roll carrying said material web, and the at least one material web holding device are expediently displaceable relative to one another for the purposes of receiving the material web to be drawn in. Said embodiment permits an orientation of the material web to be drawn in and of the at least one material web holding device with respect to one another. For example, the material web to be drawn in is, in particular by displacement of the material roll carrying said material web, displaceable for the receiving of the material web to be drawn in. It is expedient if the material web drawing-in apparatus is capable of displacing, or at least triggering a displacement of, the material web to be drawn in or the material roll carrying said material web. It is expedient here if a receiving part that receives the material roll is rotated or pivoted. Alternatively, the material web drawing-in apparatus is capable of displacing the at least one material web holding device for the receiving of the material web to be drawn in. It is expedient if the at least one material web holding device and the material web to be drawn in, or the end thereof, are oriented, during the receiving of the material web to be drawn in, such that the at least one material web holding device is capable of securely holding the material web to be drawn in at the end or edge.

The material web drawing-in apparatus preferably comprises at least one material web detection element for detecting an end of the material web to be drawn in. The at least one material web detection element is in particular capable of detecting an end (transverse) edge or a free end portion of the material web to be drawn in. Said material web detection element preferably operates in contactless fashion and is designed as a sensor, camera or the like. Alternatively, the at least one material web detection element comprises at least one contact means or probe means.

It is expedient if the at least one material web holding device is designed as a material web clamping device for holding the material web to be drawn in with clamping action. The material web clamping device is particularly functionally reliable. The material web to be drawn in remains undamaged. The material web clamping device is capable of exerting a clamping force on the material web to be drawn in during use.

The material web clamping device preferably has at least one clamping body which is displaceable between a clamping position, for holding the material web to be drawn in with clamping action, and an inactive rest position. The at least one clamping body is preferably pivotably mounted and rigid. In the clamping position, said clamping body preferably lies with clamping or frictionally locking action on the material web to be drawn in. In its inactive rest position, the at least one clamping body is expediently arranged spaced apart from the material web to be drawn in. The at least one clamping body is preferably designed as a web, plate, pin, tooth, drum or the like. Preferably, said at least one clamping body extends, preferably without interruption, over the entire width of the material web to be drawn in.

The material web clamping device expediently has at least one holding body for holding the material web to be drawn in. The at least one holding body is preferably rigid. It is preferably designed as a web, plate or the like. It preferably extends, preferably without interruption, over the entire width of the material web to be drawn in.

It is advantageous if the at least one clamping body and the at least one holding body are arranged adjacent to one another, and, in the clamping position, jointly form at least one clamping gap for holding the material web to be drawn in with clamping action. The at least one holding body preferably forms a (clamping) counterpart body for the at least one clamping body. In the clamping gap, the at least one clamping body and the at least one holding body exert a clamping force on the material web to be drawn in. The at least one clamping body and the at least one holding body are in this case preferably arranged opposite one another.

The at least one material web holding device is preferably designed as a material web suctioning device for holding the material web to be drawn in by suction action.

The material web suctioning device preferably has at least one suctioning body which is connected in terms of flow to at least one suction source and which serves for holding the material web to be drawn in. The at least one suction source is preferably designed as a vacuum pump. The flow connection between the at least one suction source and the at least one suctioning body is preferably formed by a flow line.

The at least one guide preferably has at least one first guide device to be drawn in the material web to be drawn in from a first material web drawing-in point, in particular in the case of the material web to be drawn in being unrolled from a material roll in a first unrolling direction, and at least one second guide device to be drawn in the material web to be drawn in from a second material web drawing-in point which is spaced apart from the first material web drawing-in point, in particular in the case of the material web to be drawn in being unrolled from the material roll in a second unrolling direction which is opposite to the first unrolling direction. The at least one first and second guide device are preferably arranged in a substantially V-shaped, U-shaped or Y-shaped manner. In particular, in this way, the material web to be drawn in can be received independently of its direction of unwinding from a material roll.

The at least one guide is preferably designed as a slotted guide. Said material web drawing-in apparatus is particularly functionally reliable.

The material web drawing-in apparatus is preferably capable of drawing in the material web to be drawn in in automated fashion. Said material web drawing-in apparatus is capable of drawing in the material web in, in particular fully, automated or autonomous fashion, which is highly efficient. An operator is not required for this purpose.

It is expedient if the material web working/processing arrangement, in particular material web dispensing arrangement, in particular material web unrolling arrangement, in particular material web splicing arrangement, has at least one material web drawing-in apparatus.

The at least one guide preferably forms a material web entrance for the material web working/processing arrangement. The at least one guide makes it possible, for example, for the material web to be drawn in to be introduced or threaded in from the outside into the material web working/processing arrangement in a particularly functionally reliable and efficient manner.

It is advantageous if the at least one guide runs in the material web working/processing arrangement in the direction of an exit of the material web working/processing arrangement. The at least one guide makes it possible, for example, for the material web to be drawn in to be guided in a particularly functionally reliable and efficient manner into the interior of the material web working/processing arrangement, in particular to a working/processing device or apparatus thereof.

The at least one guide preferably runs, for the purposes of preparing a material web to be worked/processed, at least between the at least one material web drawing-in point and a preparation device. The material web is guidable to a preparation device of the material web working/processing arrangement, which preparation device is preferably capable of receiving the material web for further processing.

In the event of a new introduction of a material web into the material web working/processing arrangement, the at least one guide for guiding said material web preferably runs substantially without interruption from an entrance to an exit of the material web working/processing arrangement. Said embodiment permits, for example, a particularly functionally reliable and efficient introduction of the material web to be drawn in into an adjacent, downstream arrangement, or a new introduction of a material web to be drawn in. It is expedient if the at least one guide is only intermittently closed, or capable of being passed through, in a manner dependent on a respective position of at least one working/processing device or apparatus.

The at least one guide preferably comprises at least one straight, substantially straight and/or curved guide device. The curved guide device is formed for example as an arc, in particular circular-segment-shaped arc, such as quadrant-shaped arc or semicircular arc.

It is advantageous if the material web working/processing arrangement has a first connecting device and second connecting device for connecting an end of a finite material web to a start of a further finite material web, wherein the at least one guide runs between the first connecting device and second connecting device.

The at least one guide preferably comprises at least one straight, substantially straight and/or curved guide device.

The at least one guide preferably comprises at least one guide device which is arranged in a spatially fixed manner in relation to the material web working/processing arrangement. Said embodiment is particularly simple and functionally reliable.

Preferably, the at least one guide comprises at least one displaceable, in particular slidable, guide device. The at least one displaceable guide device is preferably arranged on a displaceable working/processing device or apparatus of the material web working/processing arrangement, which permits, for example, disruption-free operation.

It is advantageous if a material roll carrying the material web to be drawn in can be received in automated fashion. Said material web working/processing arrangement is particularly efficient. In particular, the material roll can be received in fully automated or autonomous fashion.

The at least one material roll preparation arrangement preferably has at least one material roll circumferential direction orientation apparatus for orienting the material roll in a circumferential direction thereof, in particular into a defined initial situation. The at least one material roll circumferential direction orientation apparatus is preferably capable of pivoting the material roll in its circumferential direction about its longitudinal or central axis. It is expedient if the at least one material roll circumferential direction orientation apparatus orients the material roll such that, for example, the outer free end thereof and/or at least one adhesive piece arranged thereon is situated in a predetermined or defined, in particular discoverable position.

The at least one material web working/processing arrangement preferably receives the material roll in a position oriented by means of the at least one material roll circumferential direction orientation apparatus, in particular for a defined initial situation.

It is expedient if the at least one material web working/processing arrangement is capable of receiving the material roll in automated fashion.

Said material web working/processing arrangement is capable of receiving the material roll in, in particular fully, automated or autonomous fashion. This takes place in particular functionally reliably in particular if the material web working/processing arrangement receives the material roll in its oriented position. The material web working/processing arrangement then knows, for example, exactly where the outer free end of the material web to be drawn in, and/or at least one adhesive piece arranged thereon, is situated. The at least one material roll preparation arrangement preferably applies at least one adhesive piece to the material web to be drawn in for the purposes of adhesive connection to another material web.

A preferred embodiment of the invention will be described by way of example below with reference to the appended drawing.

BRIEF DESCRIPTION OF THE DRAWING

FIG. 14 shows a view corresponding to FIG. 13, wherein the clamping body is now situated in a clamping position and is clamping the material web to be drawn in, FIG. 18 shows a view corresponding to FIG. 17, wherein the material web suctioning device is active.

DESCRIPTION OF THE PREFERRED EMBODIMENT

Figure 1:
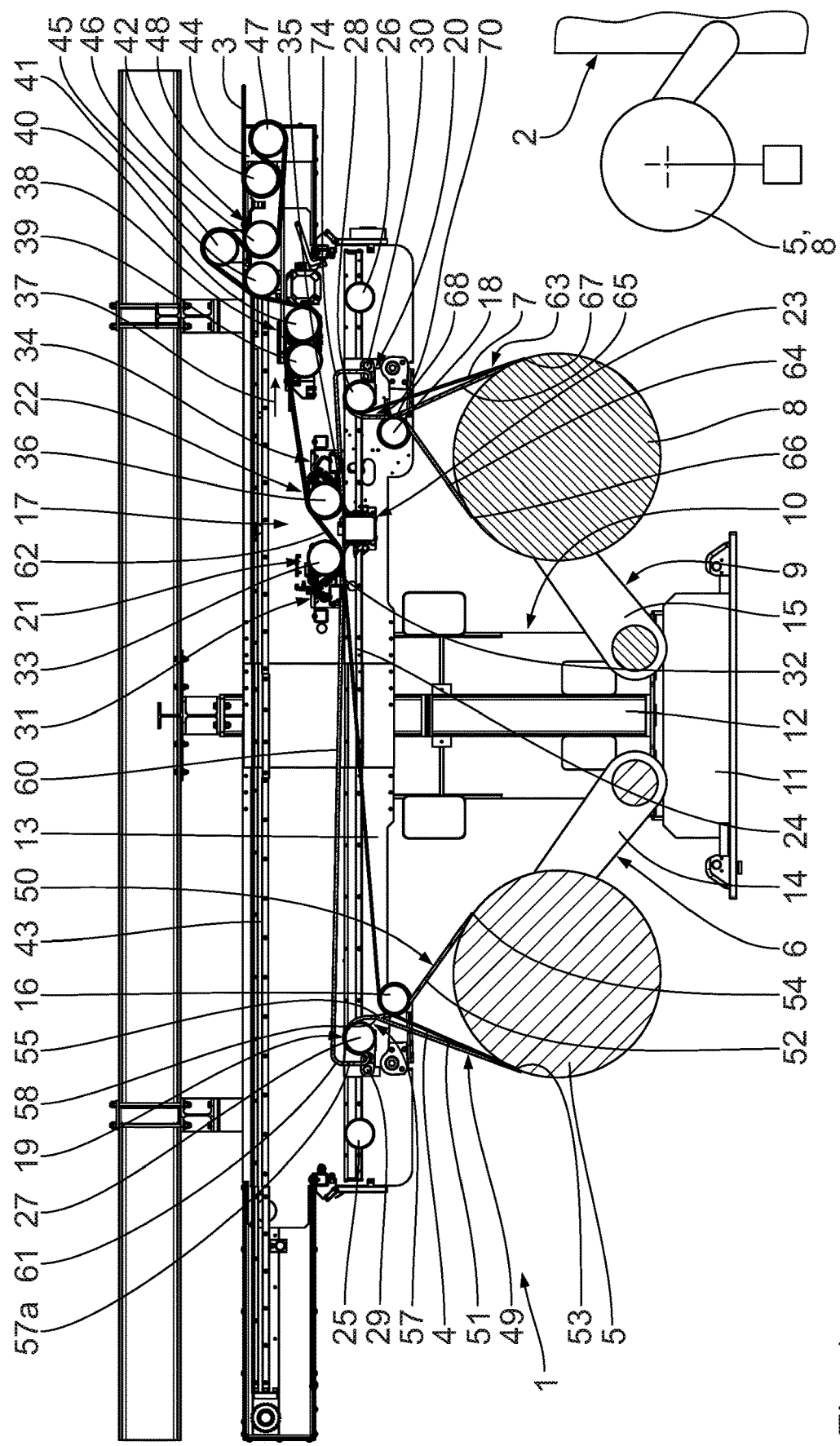
FIG. 1 shows a section through a plant according to the invention with a material roll preparation arrangement, which is illustrated in highly simplified form and not to scale, and with a material web splicing arrangement according to the invention, one material roll of which is in an unrolling state and the new material roll of which is in a prepared state.

Referring firstly to FIG. 1, a corrugated cardboard plant (not illustrated in its entirety) comprises multiple material web splicing arrangements 1 and at least one material roll preparation arrangement 2 positioned upstream thereof. The material web splicing arrangements 1 are preferably of identical design. They are arranged spaced apart from the material roll preparation arrangement 2.

The material roll preparation arrangement 2 comprises a receiving apparatus for receiving a material roll for preparation, which has a wound-up material web. Said material roll preparation arrangement furthermore has at least one, preferably multiple, material roll preparation device(s) for the preparation of the received material roll for the further working/processing.

The receiving apparatus has a rotary device for rotationally driving or pivoting the received material roll about the central axis thereof or in a circumferential direction thereof. The material roll preparation arrangement 2 preferably has a detection device for detecting a free outer end of the wound-up material web and/or at least one splicing piece arranged on the material web.

Each material web splicing arrangement 1 is provided with prepared material rolls in an oriented or defined position which constitutes a starting point for the handling by means of the material web splicing arrangement 1. For example, for this purpose, preferably automated transport carriages are used which move the prepared material rolls to the respective material roll splicing arrangement 1.

Each material web splicing arrangement 1 serves for the provision of an endless material web 3, from which, for example, a corrugated web or smooth web as a constituent part of a corrugated cardboard web laminated on one side is produced.

Since the material web splicing arrangements 1 are identical, only that illustrated in the figures will be described below. The construction thereof will firstly be discussed.

The material web splicing arrangement 1 illustrated in the figures comprises a first unrolling apparatus 6 for unrolling a finite first material web 4 from a first material roll 5 and comprises a second unrolling apparatus 9 for unrolling a finite second material web 7 from a second material roll 8. The finite first material web 4 and the finite second material web 7 are fixedly connected to one another by means of the material web splicing arrangement 1 in order to provide the endless material web 3.

The material web splicing arrangement 1 has a base frame 10 with a base frame pedestal 11, a base frame stand 12 and a base frame carrier 13. The base frame pedestal 11 is fastened to a floor or underlying surface (not illustrated).

The base frame stand 12 is attached to the top of the base frame pedestal 11. The base frame stand 12 extends vertically or perpendicularly with respect to the base. The base frame carrier 13 is arranged at an end region of the base frame stand 12 situated opposite the base frame pedestal 11 and runs parallel or horizontally with respect to the floor.

The first unrolling apparatus 6 and the second unrolling apparatus 9 extend from the base frame pedestal 11. The unrolling apparatuses 6, 9 are mounted pivotably on the base frame pedestal 11 and are arranged opposite one another relative to the base frame stand 12.

The first unrolling apparatus 6 has, for receiving the first material roll 5, a first receiving part (not illustrated) which is guided into a central opening of the first material roll 5 and which, between two first holding arms 14, running parallel to one another, of the first unrolling apparatus 6, is mounted about a horizontal first rotary axle.

The second unrolling apparatus 9 is designed correspondingly to the first unrolling apparatus 6. Said second unrolling apparatus has, for receiving the second material roll 8, a second receiving part (not illustrated) which is guided into a central opening of the second material roll 8 and which, between two second holding arms 15, running parallel to one another, of the second unrolling apparatus 9, is mounted about a horizontal second rotary axle. The rotary axles of the receiving parts run parallel to one another.

The finite first material web 4 is, as per FIG. 1, fed via a first feed drum 16 to a cutting and connecting apparatus 17 of the material web splicing arrangement 1, whereas the finite second material web 7 is, as per FIG. 1, guided via a second feed drum 18 into the material web splicing arrangement 1 for the preparation of a splicing process. Each feed drum 16, 18 is mounted rotatably on the base frame carrier 13. Said feed drums have horizontal rotary axles running parallel to one another. The feed drums 16, 18 are arranged rotatably on feed drum support arms which are mounted pivotably on the base frame carrier 13.

The cutting and connecting apparatus 17 serves for producing the endless material web 3 from the finite material webs 4, 7. Said cutting and connecting apparatus comprises a first preparation device 19, a second preparation device 20, a first connecting device 21, a second connecting device 22, a table device 23 and a guide 24.

The first preparation device 19 is, in FIG. 1, presently situated above the first material roll 5 on the base frame carrier 13, whereas the second preparation device 20 is, in FIG. 1, presently situated in the region of the second material roll 8, above the latter, on the base frame carrier 13.

The guide 24 is presently extending in/on the base frame carrier 13 and parallel to the floor. The table device 23 is arranged between the preparation devices 19, 20. The preparation devices 19, 20 and the table device 23 are displaceable along the guide 24 and relative to the connecting devices 21, 22, which are arranged, spaced apart from one another along the guide 24, on the base frame carrier 13 above the guide 24.

Furthermore, a first negative-pressure drum 25 and a second negative-pressure drum 26 are guided so as to be displaceable along the guide 24. The first negative-pressure drum 25 is, relative to the first preparation device 19, arranged oppositely in relation to the table device 23 and can be placed under negative pressure. The first preparation device 19 is thus arranged between the first negative-pressure drum 25 and the table device 23. The second negative-pressure drum 26 is, relative to the second preparation device 20, arranged oppositely in relation to the table device 23 and can be placed under negative pressure. The second preparation device 20 is thus arranged between the second negative-pressure drum 26 and the table device 23.

The preparation devices 19, 20 are of identical construction and are arranged substantially symmetrically with respect to a vertically running plane of symmetry.

For the purposes of feeding the finite first material web 4, the first preparation device 19 has a rotatably mounted first transport or holding drum 27. For the purposes of holding and feeding the finite first material web 4, the first transport drum 27 of the first preparation device 19 is provided for example with an adhesive layer and, for the purposes of transporting the finite first material web 4 to the first or second connecting device 21, 22, said first transport drum is displaceable along the guide 24. An embodiment of the first transport drum 27 without an adhesive layer is alternatively possible.

For the purposes of feeding the finite second material web 7, the second preparation device 20 has a rotatably mounted second transport or holding drum 28. For the purposes of holding and feeding the finite second material web 7, the second transport drum 28 of the second preparation device 20 is provided for example with an adhesive layer and, for the purposes of transporting the finite second material web 7 to the first or second connecting device 21, 22, said second transport drum is displaceable along the guide 24. An embodiment of the second transport drum 28 without an adhesive layer is alternatively possible.

Each preparation device 19, 20 has, for the displacement thereof along the guide 24, a dedicated first or second displacement drive 29, 30 respectively.

The connecting devices 21, 22 are of identical design and, with respect to a vertically running plane of symmetry, are arranged symmetrically on the base frame carrier 13.

The first connecting device 21 comprises a first cutting unit 31 with an actuatable first cutting blade 32 for the cutting of the finite first material web 4 prior to the connection to the finite second material web 7, and has a first pressing drum 33 for the connection of the finite material webs 4, 7 to form the endless material web 3. The first cutting unit 31 of the first connecting device 21 and the first pressing drum 33 are fastened, directly adjacent to the guide 24, to the base frame carrier 13 such that the transport drums 27, 28 of the preparation devices 19, 20 and the table device 23 can be moved past the connecting devices 21, 22 along the guide 24.

The second connecting device 22 comprises a second cutting unit 34 with an actuatable second cutting blade 35 for the cutting of the finite second material web 7 prior to the connection to the finite first material web 4, and has a second pressing drum 36 for the connection of the finite material webs 4, 7 to form the endless material web 3. The second cutting unit 34 of the second connecting device 22 and the second pressing drum 36 are fastened, directly adjacent to the guide 24, to the base frame carrier 13 such that the transport drums 27, 28 of the preparation devices 19, 20 and the table device 23 can be moved past the connecting devices 21, 22 along the guide 24.

The negative-pressure drums 25, 26, the feed drums 16, 18 and the transport drums 27, 28 and also the pressing drums 33, 36 extend parallel to one another and horizontally. They also extend parallel to the material rolls 5, 8.

The table device 23 interacts, in a manner dependent on its position, with the first preparation device 19, the second preparation device 20, the first connecting device 21 and/or the second connecting device 22 and is displaceable, in particular also independently of these, along the guide 24.

Situated downstream of the cutting and connecting device 17 in the transport direction 37 of the endless material web 3 or finite first material web 4 is a threading-in assistance arrangement 38 which is arranged substantially above the second material roll 8 and above the guide 24 on the base frame carrier 13. The threading-in assistance arrangement 38 comprises a first conveying drum 39 and a second conveying drum 40, which are identical and which are initially arranged parallel to one another. Like the negative-pressure drums 25, 26, feed drums 16, 18, transport drums 27, 28 and the pressing drums 33, 36, said conveying drums extend perpendicular to the transport direction 37 of the endless material web 3 or of the finite material web 4, 7. The conveying drums 39, 40 are arranged in the base frame carrier 13 and, together, form a conveying gap through which the endless material web 3 or the finite first material web 4 runs.

The threading-in assistance arrangement 38 furthermore comprises two conveying drum drives which are connected in terms of drive to a conveying drum 39 or 40 respectively. The conveying drums 39, 40 are coupled to one another by means of a transmission and can be driven in rotation in opposite directions. The threading-in assistance arrangement 38 is capable of assisting introduction of the finite first or second material web 4, 7 into the material web splicing arrangement 1. In the case of such a threading-in process, the conveying drums 39, 40 are driven in rotation for the corresponding threading-in of the respective finite material web 4, 7.

Arranged downstream of the threading-in assistance arrangement 38 in relation to the transport direction 37 is a first diverting drum 41, which is mounted rotatably on a store carriage 42 and which is assigned to the endless material web 3 or finite first material web 4 for the purposes of diverting the latter.

The store carriage 42 is arranged in the region of an upper end of the base frame carrier 13 which is averted from the base frame carrier 13, and said store carriage is displaceable along a store carriage guide 43 which extends parallel to the floor and above the guide 24 in the base frame carrier 13. The store carriage guide 43 defines a displacement path for the store carriage 42 and extends substantially along the entire base frame carrier 13. The store carriage 42 is displaceable between a first end position and a second end position in opposite displacement directions. In the first end position, the store carriage 42 is arranged adjacent to a material web exit 44, whereas, in the second end position, the store carriage 42 is situated spaced apart or remote from the material web exit 44. In FIG. 1, the store carriage 42 is arranged adjacent to the material web exit 44.

For the diversion of the endless material web 3 or of the finite first material web 4, a second diverting drum 45 is mounted rotatably on the base frame carrier 13 in the region of the material web exit 44, above the store carriage guide 43. The second diverting drum 45 is arranged downstream of the first diverting drum 41 in relation to the transport direction 37.

Arranged downstream of the second diverting drum 45 in relation to the transport direction 37 for the purposes of diverting the endless material web 3 or the finite first material web 4 is a third diverting drum 46, which is mounted rotatably on the store carriage 42 and which is arranged adjacent to the first diverting drum 41.

For the diversion of the endless material web 3 or of the finite first material web 4, a fourth diverting drum 47 is mounted rotatably on the base frame carrier 13 in the region of the material web exit 44, at the level of the store carriage guide 43. The fourth diverting drum 47 is arranged downstream of the third diverting drum 46 in relation to the transport direction 37.

Arranged downstream of the fourth diverting drum 47 in relation to the transport direction 37 for the purposes of diverting the endless material web 3 or the finite first material web 4 is a fifth diverting drum 48, which is mounted on the store carriage 42. The third diverting drum 46 is arranged between the first diverting drum 41 and the fifth diverting drum 48.

The rotary axles of the diverting drums 41, 45, 46, 47, 48 run parallel to one another and lie in a common horizontal plane. They extend perpendicular to the transport direction 37.

The store carriage 42 is displaceable along the store carriage guide 43 owing to a change in the web tension of the endless material web 3. Alternatively or in addition, the store carriage 42 is displaceable by means of a store carriage adjustment drive.

The material web splicing arrangement 1 has a material web drawing-in slotted guide 49 for guiding the finite first material web 4, the finite second material web 7 and/or the endless material web 3 during a drawing-in process.

In the case of a complete drawing-in process, the slotted guide 49 extends from a material web entrance of the material web splicing arrangement 1, or from the first material roll 5 and the second material roll 8 respectively, without interruption or substantially as far as the material web exit 44, or beyond the latter. Alternatively, said slotted guide then for example has at least one interruption between the material web entrance, the first material roll 5 and the second material roll 8 respectively, and the material web exit 44.

The slotted guide 49 has an entrance-side first guide apparatus 50 which is arranged fixedly on the base frame carrier 13 and which is assigned to the first holding arm 14 or to the first material roll 5. The entrance-side first guide apparatus 50 comprises an entrance-side straight or substantially straight first guide device 51 and an entrance-side substantially straight second guide device 52. The entrance-side first guide device 51 and the entrance-side second guide device 52 run substantially obliquely with respect to one another. They are immovable relative to one another.

The entrance-side first guide device 51 has, adjacent to the first material roll 5, a free first drawing-in entrance 53, which is averted from the base frame carrier 13. The entrance-side second guide device 52 has, adjacent to the first material roll 5, a free second drawing-in entrance 54, which is averted from the base frame carrier 13 and which is arranged spaced apart from the first drawing-in entrance 53. The first drawing-in entrance 53 and the second drawing-in entrance 54 are, in a circumferential direction around the first material roll 5, arranged adjacent to the first material roll 5 during a drawing-in process.

The entrance-side first guide device 51 and the entrance-side second guide device 52 run towards one another proceeding from their respective drawing-in entrance 53 or 54 in the direction of the base frame carrier 13, and converge at a first merging point 55 of the slotted guide 49. The entrance-side first guide apparatus 50 is substantially V-shaped.

Downstream of the first merging point 55 in relation to a drawing-in direction or the transport direction 37 of the material web 3, 4 to be drawn in, the entrance-side first guide apparatus 50 has a common first exit 56, which is arranged below the guide 24 and which faces towards the guide 24 or is oriented vertically upward. The first exit 56 is arranged adjacent to the first feed drum 16.

The slotted guide 49 furthermore comprises a first guide arc device 57 which is arranged at the first preparation device 19 or at the carriage thereof and the entrance 58 of which faces downwards or faces towards the first material roll 5. The first guide arc device 57 runs around the first transport drum 27, adjacently above or adjacently laterally above the latter, in substantially semicircular fashion and has, at an exit side, a first reversal region 57a which, above the guide 24 or at an upper region thereof, has an upwardly open first exit end 59.

Arranged above the guide 24, on the base frame carrier 13, is a substantially rectilinear first guide device 60 of the slotted guide 49. The substantially rectilinear first guide device 60 extends adjacent to the guide 24 and runs substantially from the level of the first feed drum support arm downwards as far as the first pressing drum 33. Upstream, the substantially rectilinear first guide device 60 has a downwardly open first connection 61.

The substantially rectilinear first guide device 60 is adjoined, oppositely in relation to the first connection 61, by an obliquely running first guide device 62 of the slotted guide 49. The obliquely running first guide device 62 extends from the first pressing drum 33 obliquely from bottom to top in the transport direction 37 in the direction of the second pressing drum 36 and obliquely relative to the guide 24. Said first guide device ends at the top adjacent to the second pressing drum 36.

The slotted guide 49 furthermore has an entrance-side second guide apparatus 63, which is of substantially identical design to the entrance-side first guide apparatus 50 and which is arranged fixedly on the base frame carrier 13. The entrance-side second guide apparatus 63 is assigned to the second support arm 15 or to the second material roll 8. Said entrance-side second guide apparatus comprises an entrance-side substantially straight first guide device 64 and an entrance-side substantially straight second guide device 65. The entrance-side first guide device 64 and entrance-side second guide device 65 of the entrance-side second guide apparatus 63 run substantially obliquely with respect to one another. They are immovable relative to one another.

The entrance-side first guide device 64 has, adjacent to the second material roll 8, a free first drawing-in entrance 66, which is averted from the base frame carrier 13. The entrance-side second guide device 65 has, adjacent to the second material roll 8, a free second drawing-in entrance 67, which is averted from the base frame carrier 13 and which is arranged spaced apart from the first drawing-in entrance 66. The first drawing-in entrance 66 and the second drawing-in entrance 67 are, in a circumferential direction around the second material roll 8, arranged adjacent to the second material roll 8 during a drawing-in process.

The one entrance-side first guide device 64 and the entrance-side second guide device 65 run towards one another proceeding from their respective drawing-in entrance 66 or 67 in the direction of the base frame carrier 13, and converge at a second merging point 68 of the slotted guide 49. The entrance-side second guide apparatus 63 is substantially V-shaped.

Downstream of the second merging point 68 in relation to a drawing-in direction or the transport direction 37 of the material web 3, 7 to be drawn in, the entrance-side second guide apparatus 63 has a common second exit 69, which is arranged below the guide 24 and which faces towards the guide 24 or is oriented vertically upward. The second exit 69 is arranged adjacent to the second feed drum 18.

The slotted guide 49 furthermore comprises a second guide arc device 70 which is arranged at the second preparation device 20 or at the carriage thereof and the second entrance of which faces downwards or faces towards the second material roll 8. The second guide arc device 70 runs around the second transport drum 28, adjacently above or adjacently laterally above the latter, in substantially semicircular fashion and has, at an exit side, a second reversal region 71 which, above the guide 24 or at an upper region thereof, has an upwardly open second exit end 72. The second guide arc device 70 is of symmetrical design in relation to the first guide arc device 57 with respect to a vertical plane of symmetry.

Arranged above the guide 24, on the base frame carrier 13, is a substantially rectilinear second guide device 73 of the slotted guide 49. The substantially rectilinear second guide device 73 extends adjacent to the guide 24 and runs substantially from the level of the second feed drum support arm downwards as far as the second pressing drum 36. Upstream, the substantially rectilinear second guide device 73 has a downwardly open second connection 74.

The substantially rectilinear second guide device 73 is adjoined, oppositely in relation to the second connection 74, by a substantially semicircular-arc-shaped second guide device 75 of the slotted guide 49. The substantially semicircular-arc-shaped second guide device 73 extends adjacent, or laterally adjacent, to the second pressing drum 36 on the side facing towards the first pressing drum 33.

The obliquely running first guide device 62 and the substantially semicircular-arc-shaped second guide device 75 run towards one another and merge at a third merging point 76 at the top adjacent, or laterally, with respect to the second pressing drum 36.

The third merging point 76 is adjoined, downstream, by an exit-side guide device 77, which runs just to the threading-in assistance arrangement 38 and which extends adjacently from above or laterally adjacently with respect to a conveying gap formed between the conveying drums 39, 40. The exit-side guide device 77 extends there adjacently or laterally adjacently with respect to the conveying drums 39, 40. Said exit-side guide device extends substantially in the manner of a quadrant-shaped arc around the first conveying drum 39, or laterally adjacently with respect thereto, and substantially in the manner of a semicircular arc around the second conveying drum 40, or laterally adjacently with respect thereto.

The exit-side guide device 77 furthermore extends adjacently, or laterally adjacently, around the first diverting drum 41 on the store carriage 42.

The exit-side guide device 77 furthermore extends adjacently, or laterally adjacently, in substantially semicircular-arc-shaped fashion around the spatially fixed second diverting drum 45.

The exit-side guide device 77 extends in the manner of a circular-segment-shaped arc adjacently or laterally adjacently around the third diverting drum 46 on the store carriage 42.

The exit-side guide device 77 extends, substantially in the shape of an arc covering three-quarters of a circle, adjacently or laterally adjacently around the spatially fixed fourth diverting drum 47.

The exit-side guide device 77 extends, substantially in the shape of an arc covering three-quarters of a circle, adjacently or laterally adjacently around the fifth diverting drum 48 on the store carriage 42.

The exit-side guide device 77 runs out of the material web splicing arrangement 1 beyond the material web exit 44.

Each guide device 51, 52, 57, 60, 62, 64, 65, 70, 73, 75, 77 comprises guide elements which are situated opposite one another and which are arranged in pairs and which are correspondingly identically shaped and of rail-like or slotted-guide-like form. The guide elements are arranged in each case adjacently laterally, or adjacently laterally at the outside, with respect to the material web 3, 4, 7 to be drawn in. Said guide elements are preferably arranged spaced apart, in the transverse direction of the material web 3, 4, 7, from the material web 3, 4, 7 to be drawn in, or from the longitudinal edge thereof. The guide elements are open towards the material web 3, 4, 7 to be drawn in, and are for example U-shaped in cross section.

The material web splicing arrangement 1 comprises at least one material web clamping device 78 for holding the material web 3, 4, 7 to be drawn in with clamping action (FIGS. 11 to 14).

The material web clamping device 78 has a profile-like rigid transverse member 79, which extends in the transverse direction of the material web 3, 4, 7 to be drawn in and which, in the transverse direction of the material web 3, 4, 7 to be drawn in, protrudes laterally in relation thereto. The transverse member 79 engages into mutually oppositely situated guide elements and is thus guided displaceably perpendicularly with respect to its extent. The transverse member 79 is displaceable along the slotted guide 49 and is thus capable of performing translational and/or arcuate movements or the like in a manner dependent on its position. Said transverse member extends perpendicularly between the mutually oppositely situated guide elements.

The transverse member 79 has a material web receiving opening 80 which is open oppositely to the drawing-in direction or transport direction 37. Said transverse member is substantially U-shaped. The transverse member 79 has a base 81, which is situated opposite the material web receiving opening 80, and a holding bar 82, which projects from the base 81, and an outer bar 83, which projects from the base 81. The holding bar 82 and outer bar 83 run so as to be parallel to and spaced apart from one another.

During a drawing-in process, the holding bar 82 interacts with the material web 3, 4, 7 to be drawn in, whereas the outer bar 83 is arranged spaced apart from said material web to be drawn in.

The transverse member 79 serves for the mounting of a clamping beam 84 which is arranged between the holding bar 82 and the outer bar 83 and which is pivotable relative thereto. The clamping beam 84, proceeding from the base 81, protrudes preferably beyond the holding bar 82 and the outer bar 83.

Adjacent to the first and second drawing-in entrance 53 and 54 of the entrance-side first guide apparatus 50, and adjacent to the first and second drawing-in entrance 66 and 67 of the entrance-side second guide apparatus 63, there is preferably arranged, at the mutually opposite guide elements, in each case one activation device 85 which comprises an electrical pulse receiver 86. The activation device 85 is assigned to the clamping beam 84. The pulse receiver 86 is connected to the clamping beam 84 and is capable of pivoting the latter.

On the base 81, opposite the clamping beam 84, there are arranged two coupling chains 87. The coupling chains 87 run in the mutually oppositely situated guide elements of the guide devices 51, 52, 57, 60, 62, 64, 65, 70, 73, 75, 77 and are displaceable by motor means. The slotted guide 49, the material web clamping device 78 and the coupling chains 87 together with the displacement drive(s) thereof are a constituent part of a material web drawing-in apparatus.

The operation of the material web splicing arrangement 1 will be described by way of example below. Here, FIG. 1 is taken as a starting point. In FIG. 1, the finite first material web 4 is being unrolled from the first material roll 5 and thus conveyed. Said finite first material web has been drawn into the material web splicing arrangement 1 by means of the material web drawing-in apparatus, with the finite first material web 4 being unrolled from the first material roll 5, as will be described in more detail below.

The finite first material web 4 is guided over the first feed drum 16, where the finite first material web 4 is diverted, to the cutting and connecting apparatus 17. Said finite first material web is led through between the mutually spaced-apart pressing drums 33, 36, and lies circumferentially against these in regions.

Downstream of the cutting and connecting apparatus 17, the finite first material web 4 or the endless material web 3 is introduced from above into the threading-in assistant arrangement 38 and loops around the two conveying drums 39, 40 thereof, wherein said material web lies against the conveying drums 39, 40. The threading-in assistance arrangement 38 expediently assists the transport of the finite first material web 4 or of the endless material web 3 and is correspondingly driven.

Subsequently, the finite first material web 4 or the endless material web 3 is guided around the first diverting drum 41 on the store carriage 42. Subsequently, the finite first material web 4 or the endless material web 3 is guided around the spatially fixed second diverting drum 45. Subsequently, the finite first material web 4 or the endless material web 3 is guided around the third diverting drum 46 on the store carriage 42. Subsequently, the finite first material web 4 or the endless material web 3 is guided around the spatially fixed fourth diverting drum 47. Subsequently, the finite first material web 4 or the endless material web 3 is guided around the fifth diverting drum 48 on the store carriage 42. Subsequently, the finite first material web 4 or the endless material web 3 exits the material web splicing arrangement 1 via the material web exit 44.

The finite first material web 4 or the endless material web 3 extends, for the most part, adjacent to the slotted guide 49.

Here, the store carriage 42 is arranged adjacent to the material web exit 44. The first negative-pressure drum 25 is arranged spaced apart from the first transport drum 27. The table device 23 is situated adjacent to the connecting devices 21, 22. Said table device is arranged spaced apart from the preparation devices 19, 20.

The cutting and connecting device 17 is in its inactive state. In this state, the finite first material web 4 or the endless material web 3 is merely guided through the cutting and connecting device 17.

In FIG. 1, the finite second material web 7 has been drawn into the material web splicing arrangement 1 by means of the material web drawing-in apparatus, with the finite second material web 7 being unrolled from the second material roll 8. The material web splicing arrangement 1 has received the second material roll 8 and also the first material roll 5 after orientation in their circumferential direction in an exact defined initial situation by means of the material roll preparation arrangement 2.

For the drawing-in of the finite second material web 7, the clamping beam 84 is situated in its clamping position and has been pivoted in the direction of the material web holding bar 82 so as to clamp the finite second material web 7. The finite second material web 7 to be drawn in is thus arranged, and held with clamping action, between the holding bar 82 and the clamping beam 84. Said material web extends through the material web receiving opening 80. The coupling chains 87 are drawn in synchronously by motor means, such that the transverse member 79 together with the fixed finite second material web 7 is pulled along the slotted guide 49 as far as the second preparation device 20. The transverse member 79 is pulled around the transport drum 28 such that it faces towards the second negative-pressure drum 26. The finite second material web 7 enters the slotted guide 49 via the free second drawing-in entrance 67 owing to the unwinding direction of the second material roll 8.

The second exit 69 of the entrance-side second guide apparatus 63 and the second entrance of the second guide arc device 70 are arranged adjacent to one another such that the finite second material web 7 is, during the drawing-in process, capable of passing from the entrance-side second guide apparatus 63 into the second guide arc device 70. The second exit end 72 of the second guide arc device 70 and the second connection 74 of the substantially rectilinear second guide device 73 are arranged adjacent to one another, such that the finite second material web 7 is, during the drawing-in process, capable of passing from the second guide arc device 70 into the substantially rectilinear second guide device 73. The second preparation device 20 together with the second guide arc device 70 have, for this purpose, been correspondingly displaced along the guide 24.

Figure 2:
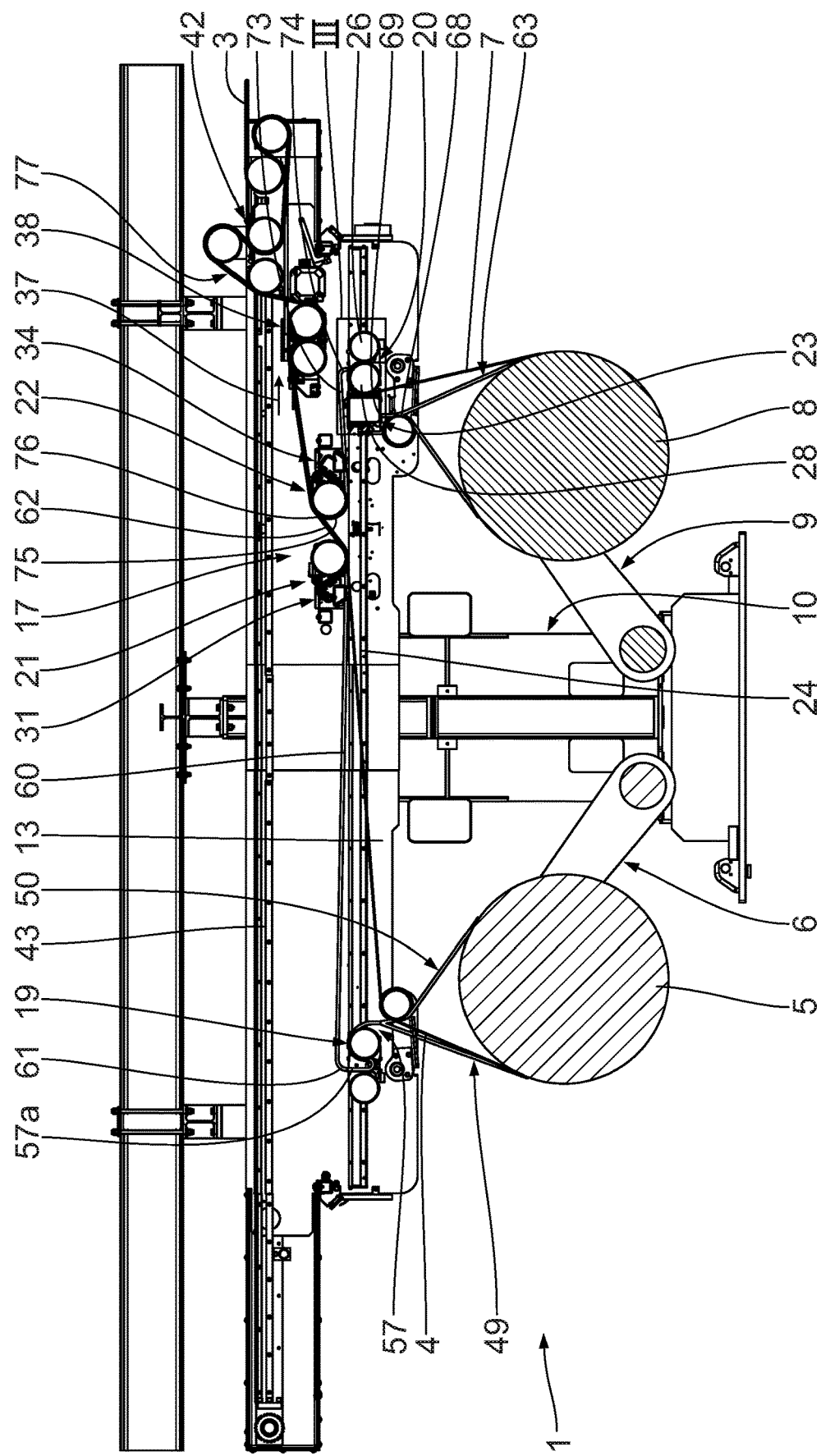
FIG. 2 shows a view corresponding to FIG. 1 of the material web splicing arrangement, one negative-pressure drum of which is, for the preparation of the new material web, arranged adjacent to an adhesive piece on the new material web for the purposes of removing the release liner of said adhesive piece.

As shown in FIG. 2, for a splicing process, the table device 23 subsequently travels along the guide 24 to the second preparation device 20. When the second preparation device 20 and the table device 23 have been arranged adjacent to one another, the threaded-in finite second material web 7 is held with clamping action between the second preparation device 20 and the table device 23. In particular, the finite second material web 7 is held between the second transport drum 28 and a holding element 88 of the table device 23, with deformation of said material web. The table device 23 and the second preparation device 20 assume a holding position.

Figure 3:
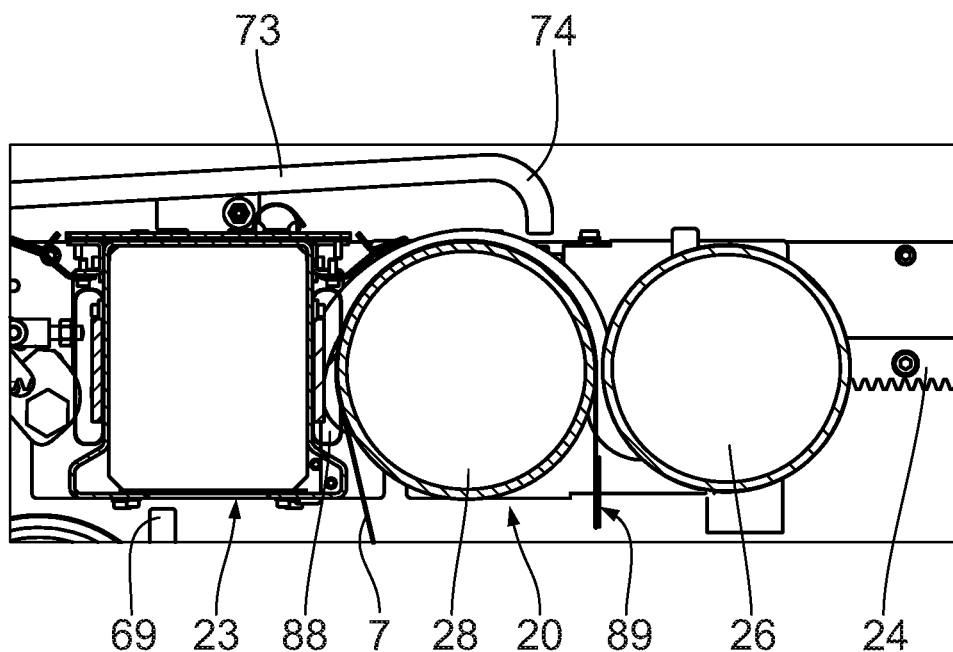
FIGS. 3, 4 show enlarged partial views III, IV of FIG. 2, which illustrate the removal of the release liner.
Figure 4:
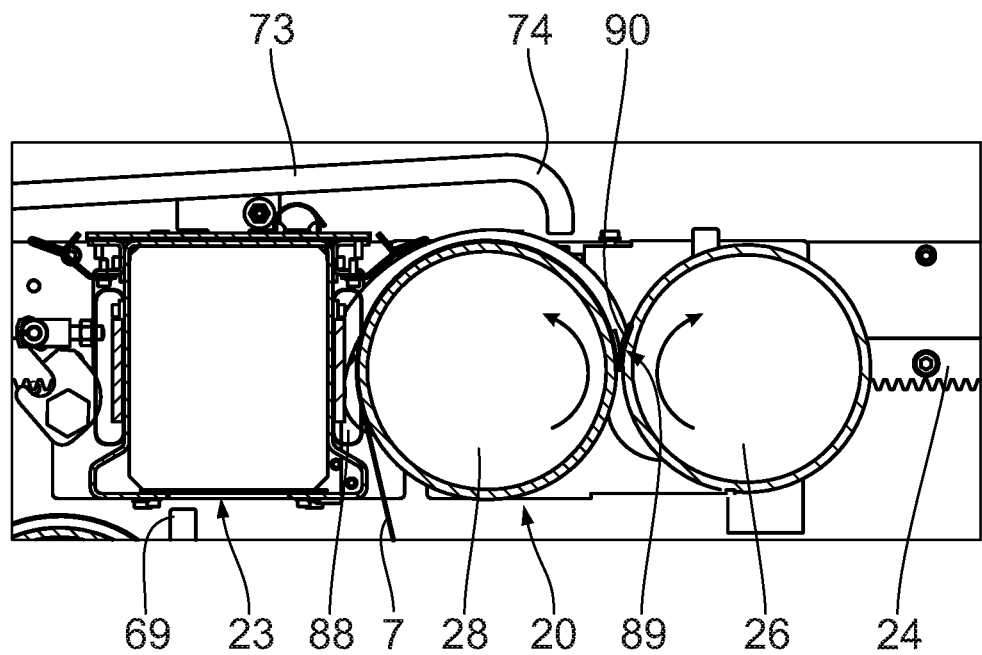

Subsequently, the table device 23 travels along the guide 24 to the second preparation device 20. The table device 23 and the second preparation device 20 together with second guide arc device 70 travel jointly along the guide 24 in the direction of the second negative-pressure drum 26, which in turn travels in the direction of the second preparation device 20. When the second transport drum 28 and the second negative-pressure drum 26 have been arranged adjacent to one another, the second exit 69 of the entrance-side second guide apparatus 63 and the second entrance of the second guide arc device 70 have been arranged so as to be separate from one another or spaced apart from one another. The second exit end 72 of the second guide arc device 70 and the second connection 74 of the substantially rectilinear second guide device 73 have been arranged so as to be separate from one another or spaced apart from one another (FIG. 3).

The second transport drum 28 and the second negative-pressure drum 26 are then driven in rotation in opposite directions such that the finite second material web 7 is conveyed back counter to its actual drawing-in direction, and a splicing piece 89 which is arranged at the end on the finite second material web 7 and which is adhesive on both sides arrives between a gap formed by the second transport drum 28 and the second negative-pressure drum 26. The splicing piece 89 is in adhesive connection, by means of an inner adhesive surface, with the finite second material web 7. Here, the splicing piece 89 faces with its detachable non-adhesive release liner 90 towards the second negative-pressure drum 26 and lies with the release liner 90 against said second negative-pressure drum. The second negative-pressure drum 26 is active and thus, by means of its generated negative pressure, suctions the release liner 90 of the splicing piece 89 and thus removes said release liner from the splicing piece 89 itself, so as to expose an outer adhesive surface, situated opposite the inner adhesive surface, of the splicing piece 89. The second transport drum 28 and second negative-pressure drum 26 are constituent parts of a release liner removal apparatus.

Figure 5:
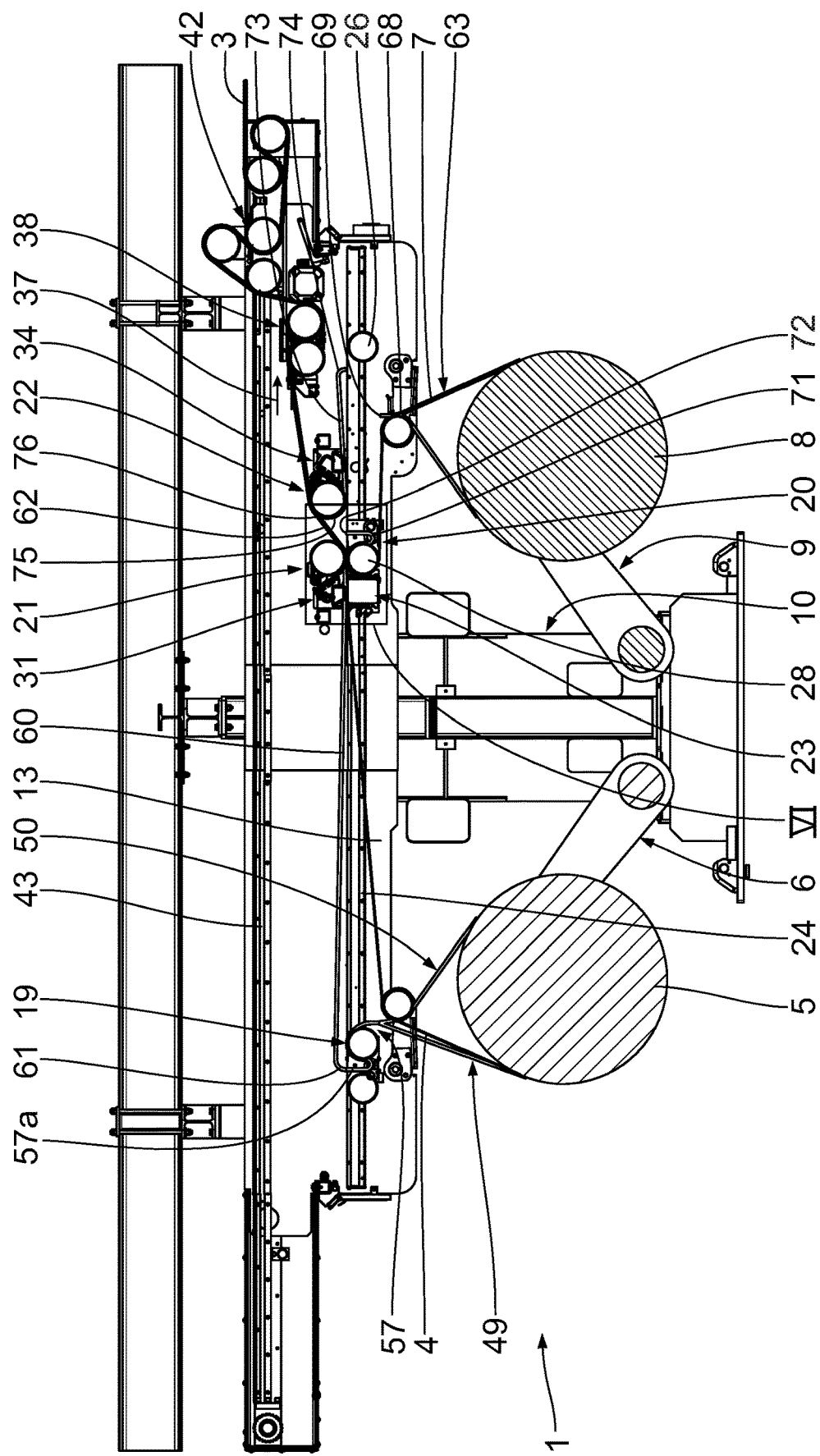
FIG. 5 shows a view corresponding to FIG. 2 of the material web splicing arrangement, in the case of which a connecting device and preparation device and table device are arranged adjacent to one another for the purposes of connecting the new and original material webs.

The second preparation device 20 and the table device 23 then travel in the coupled state along the guide 24 in the direction of the first preparation device 19 or to the first connecting device 21, wherein the finite second material web 7 is held with clamping action between the table device 23 and the second transport drum 28. The second preparation device 20 and the table device 23 move away from the second negative-pressure drum 26 (FIG. 5). The second transport drum 28 is blocked in terms of its rotation.

The second transport drum 28 is then released again in terms of its rotation. In particular, as a result of the displacement of the table device 23 and of the second transport drum 28 as a unit, the second transport drum 28 is pivoted such that the splicing piece 89 passes into an upwardly facing splicing position.

Figure 6:
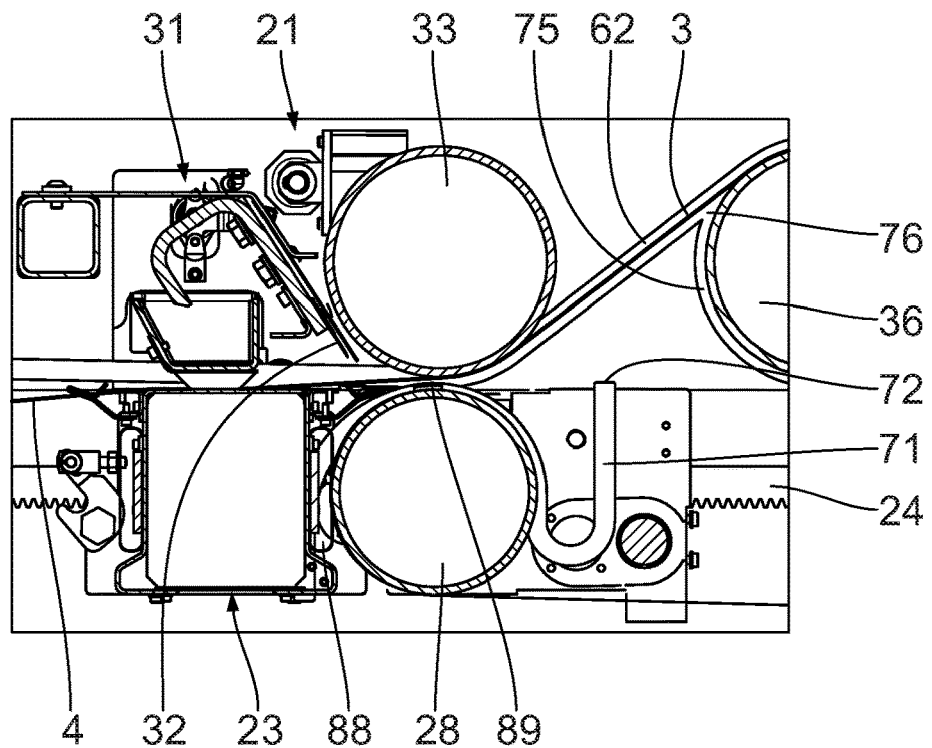
FIGS. 6, 7 show enlarged partial views of FIG. 5, which illustrate a cutting-off of the original material web and the production of the spliced connection between the new and original material webs.
Figure 7:
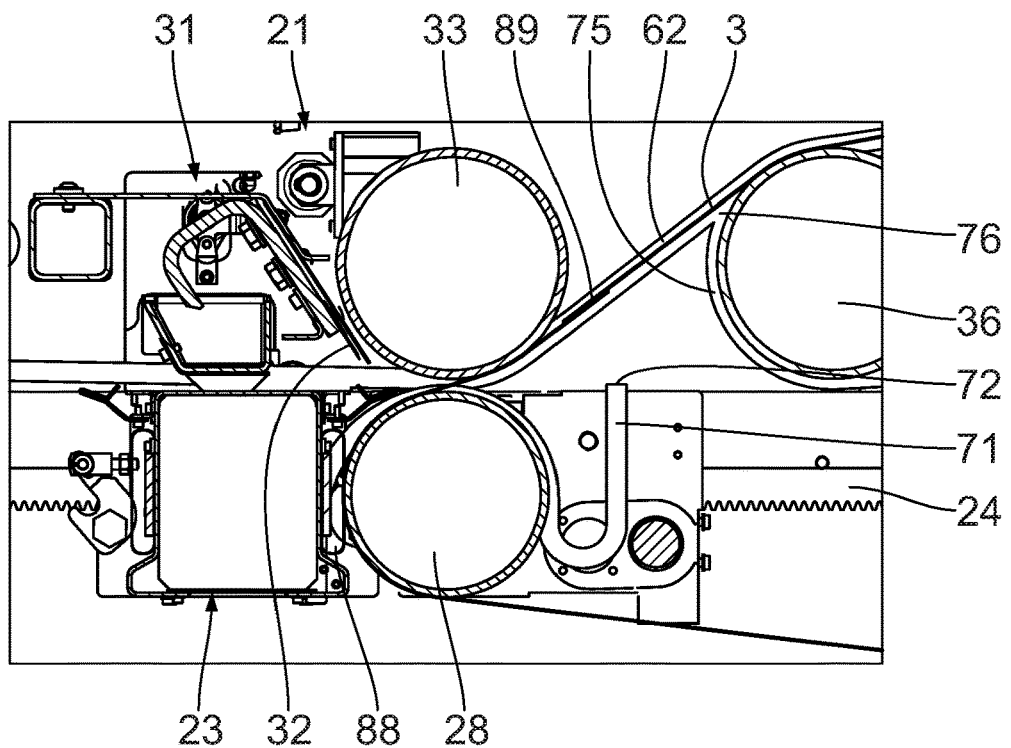

As shown in FIGS. 5 and 6, the second transport drum 28 is moved under the first connecting device 21 such that the splicing piece 89 faces towards the first connecting device 21. The endless material web 3 or finite first material web 4 is, by means of displacement of the first pressing drum 33 of the first connecting device 21, pressed against the adhesive splicing piece 89, which faces towards the first pressing drum 33. This results in an adhesive connection of the endless material web 3 or finite first material web 4 to the finite second material web 7. The feed of the finite first material web 4 to the endless material web 3 is stopped. By means of the first cutting blade 32, the finite first material web 4 is severed from the endless material web 3.

As a result of displacement of the store carriage 42 away from the material web exit 44, the loops formed by the endless material web 3 are eliminated, in order that the endless material web 3 furthermore remains without interruption or is conveyed without interruption.

Figure 8:
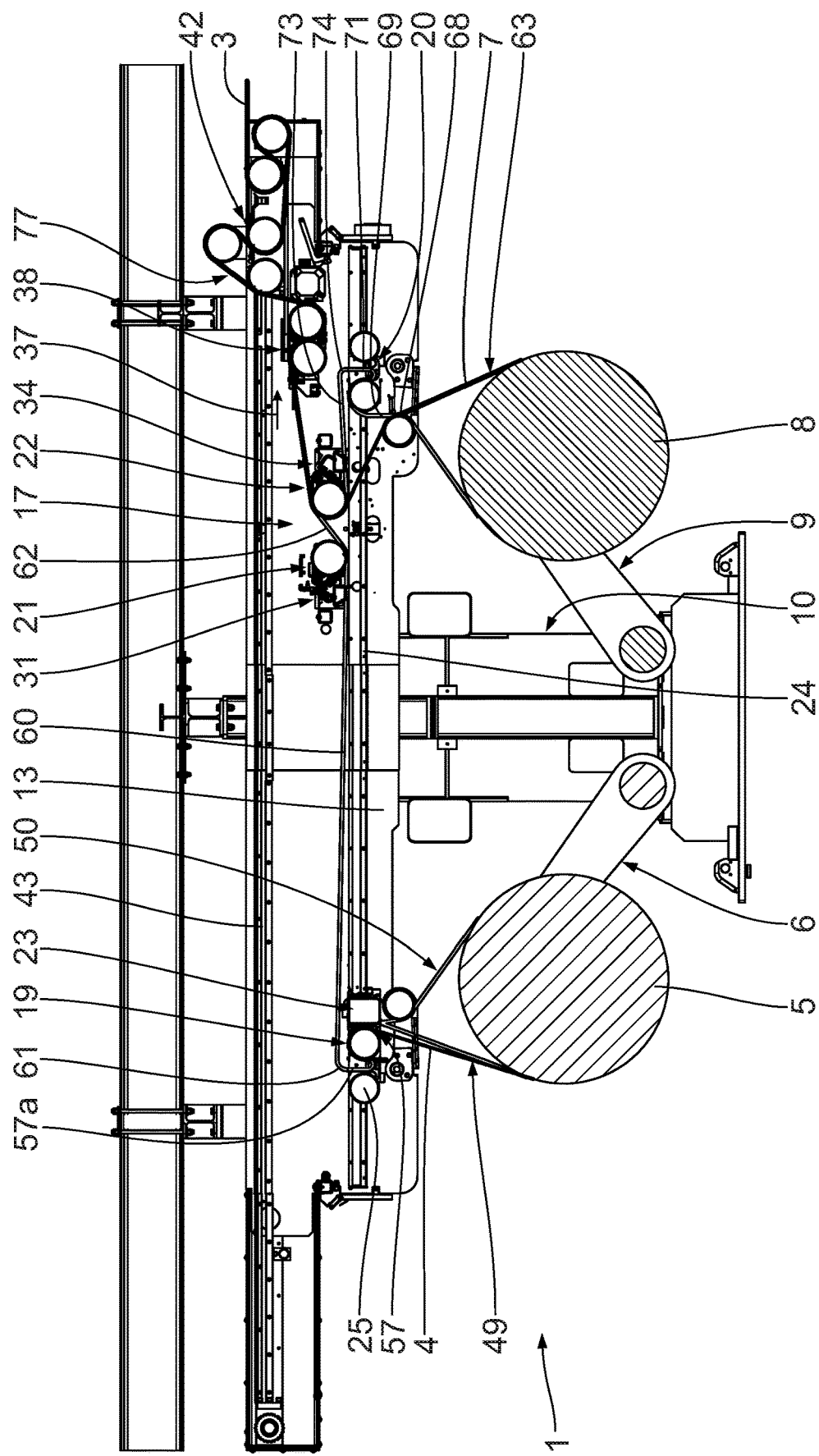
FIG. 8 shows a view corresponding to FIG. 2, in the case of which, by contrast to FIG. 1, the other material roll is now in an unrolling state.

In FIG. 8, it is now the case that the finite second material web 7 is being unrolled from the second material roll 8. The first material roll 5 is now prepared for the later unrolling thereof, analogously to the description above. The drawing-in of the finite first material web 4 into the material web splicing arrangement 1 takes place substantially analogously by means of the material web drawing-in apparatus.

Figure 9:
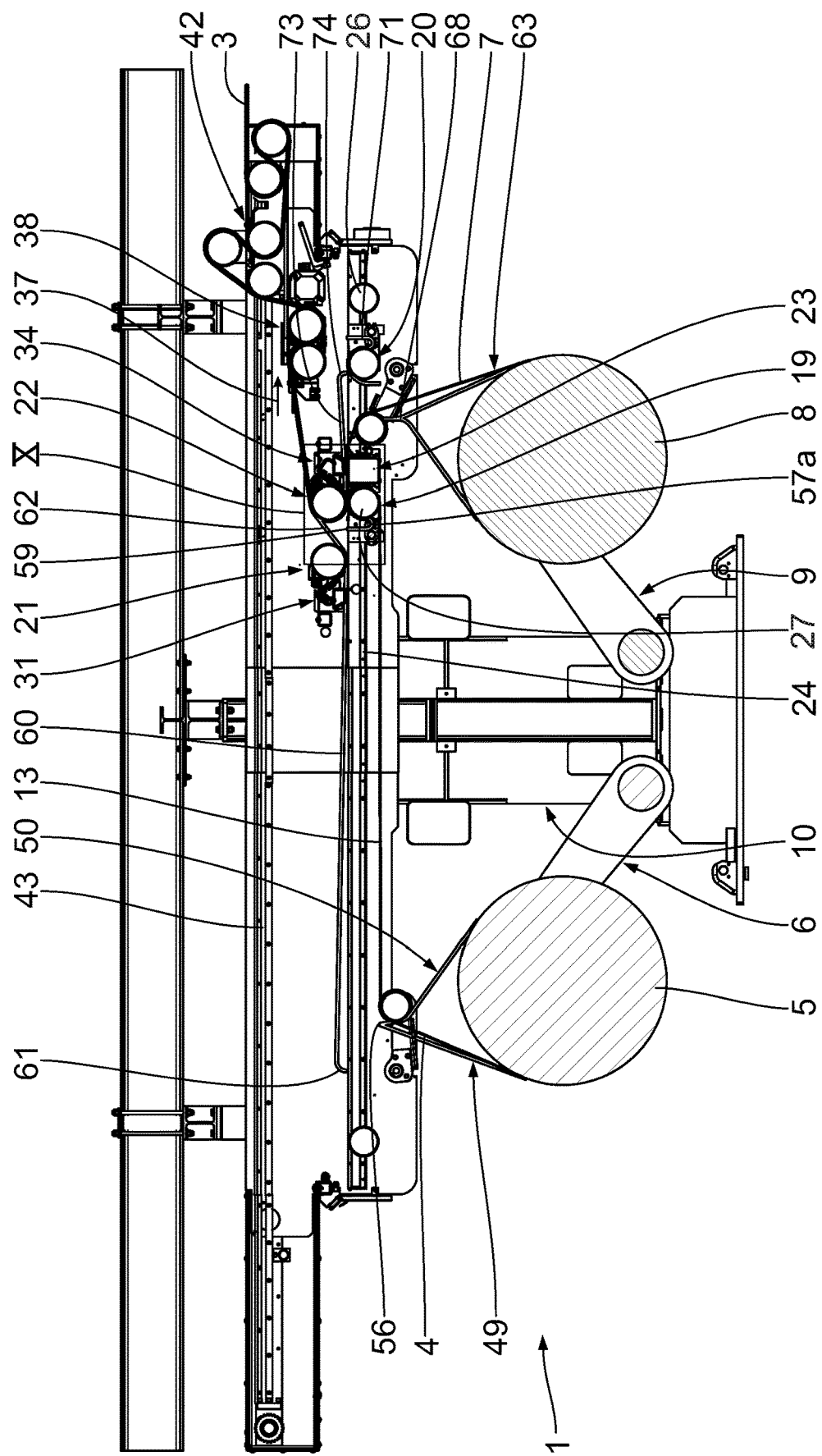
FIG. 9 shows a view corresponding to FIG. 2, in the case of which, by contrast to FIG. 3, the other connecting device and the other preparation device and the table device are arranged adjacent to one another for the purposes of connecting the material webs.
Figure 10:
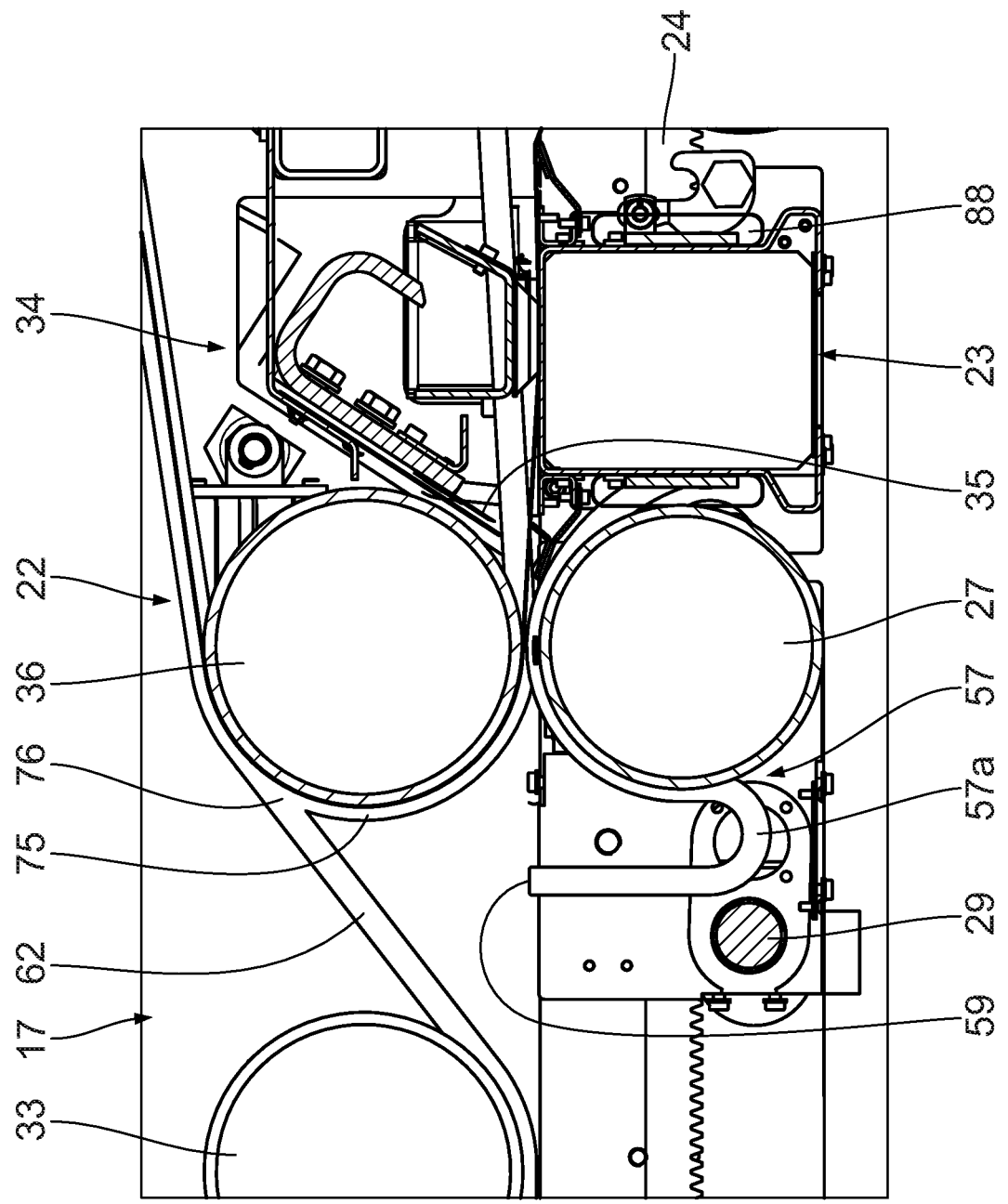
FIG. 10 shows an enlarged partial view IX of FIG. 9.
Figure 11:
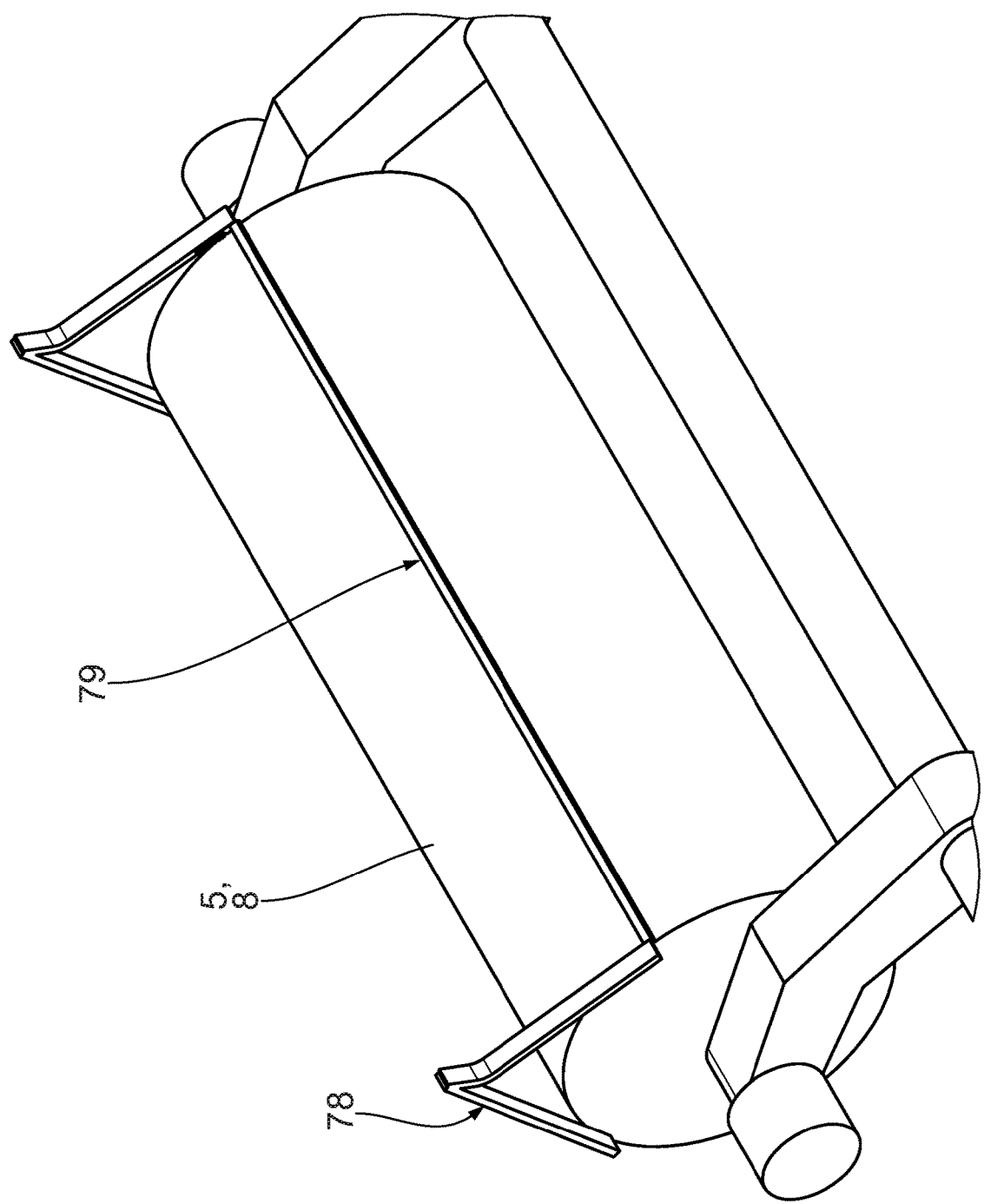
FIG. 11 shows a perspective view of a material roll arranged in the illustrated material web splicing arrangement, together with entrance-side guide devices of the guide.
Figure 12:
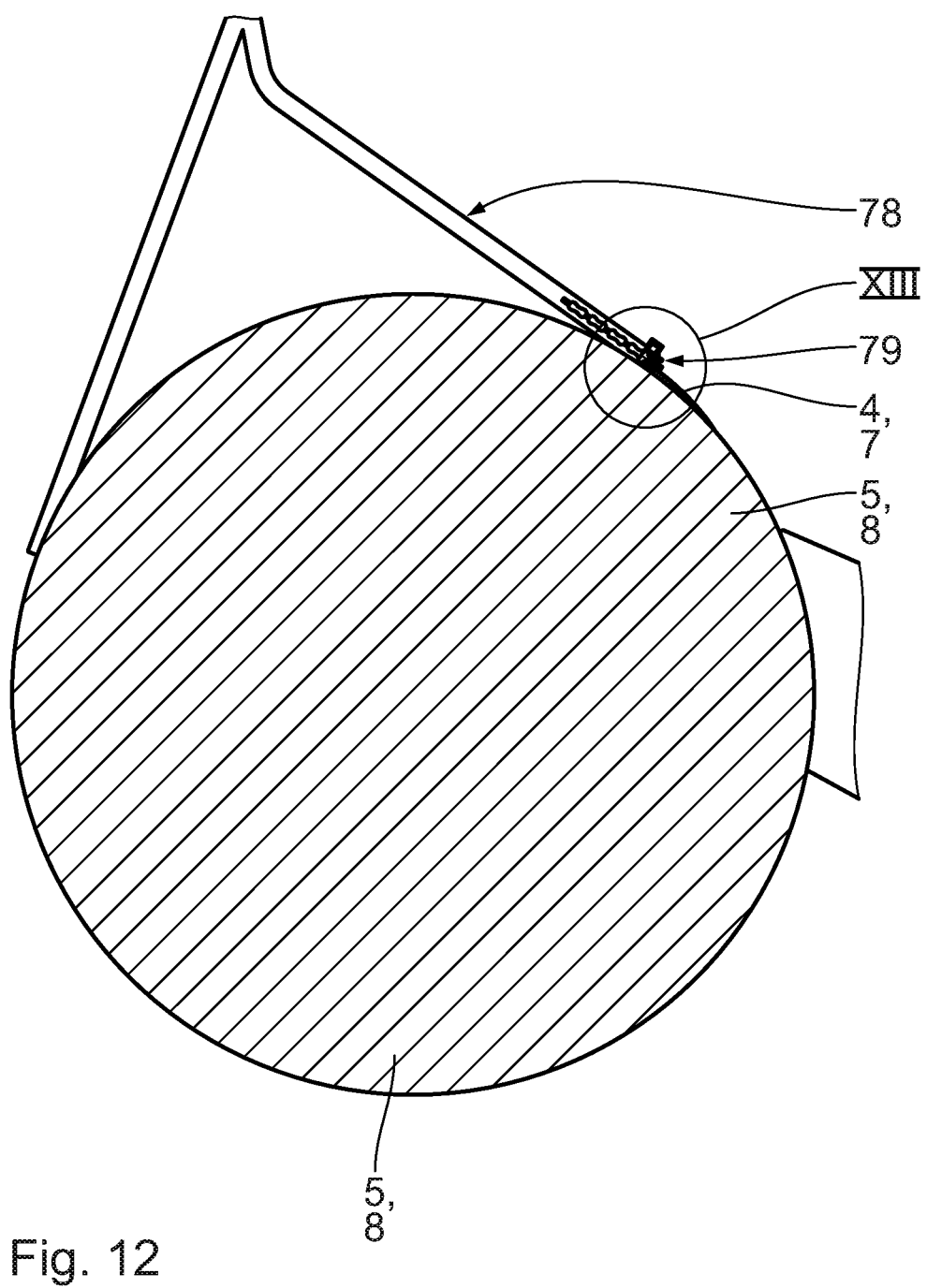
FIG. 12 shows a cross section through the arrangement shown in FIG. 11.
Figure 13:
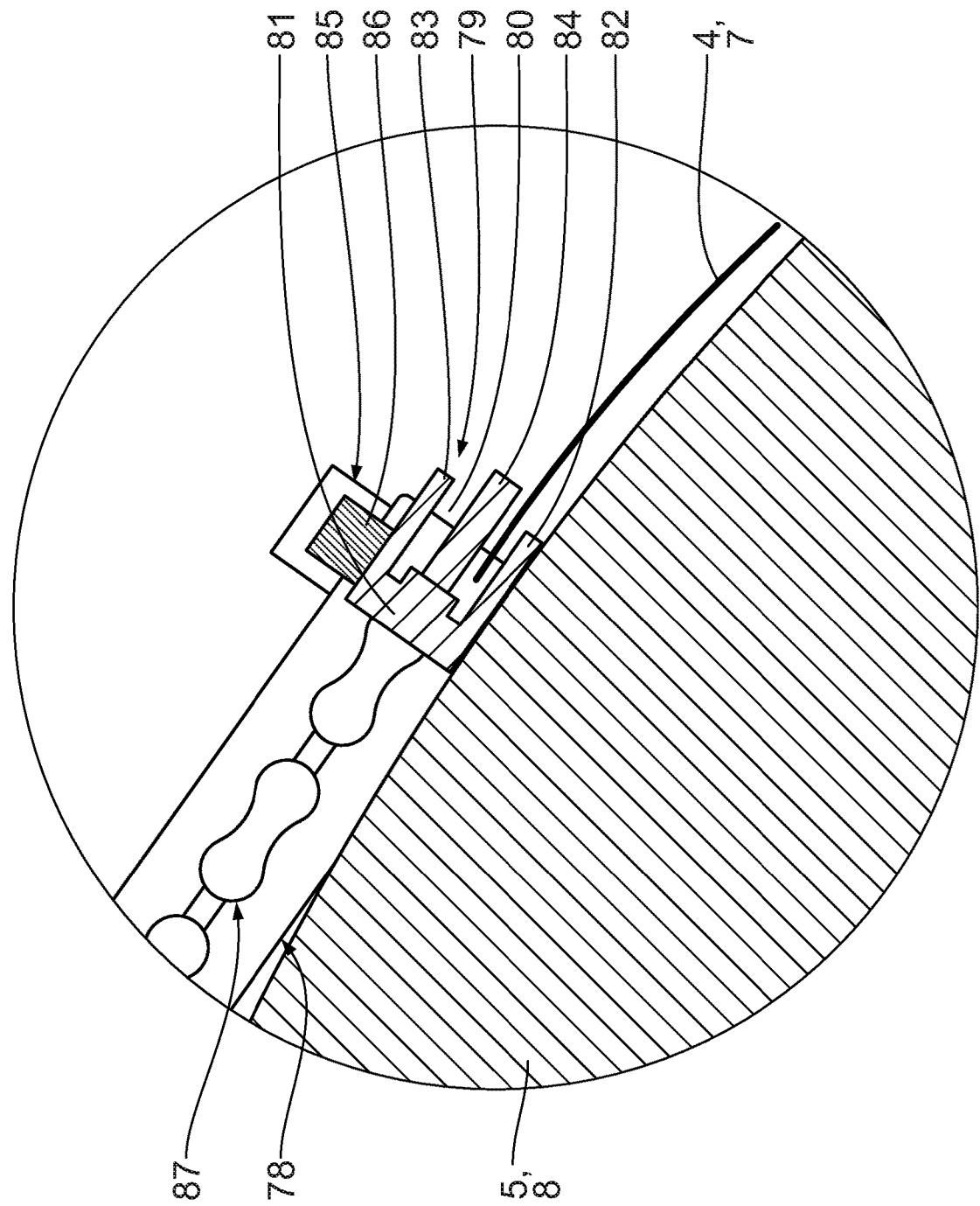
FIG. 13 shows the detail XIII indicated in FIG. 12 on an enlarged scale, wherein the clamping body of the material web clamping device is in an inactive rest position.
Figure 14:
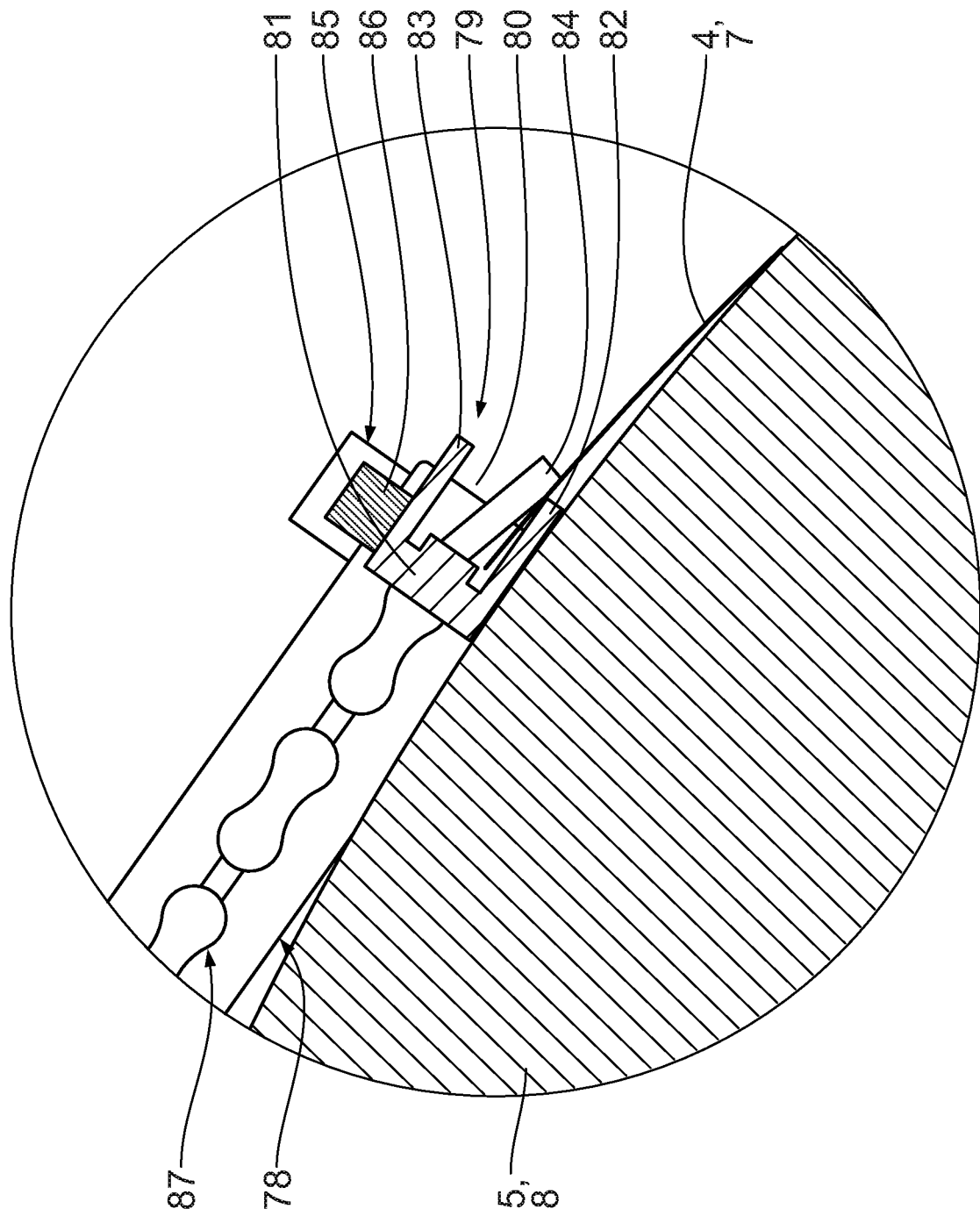
Figure 15:
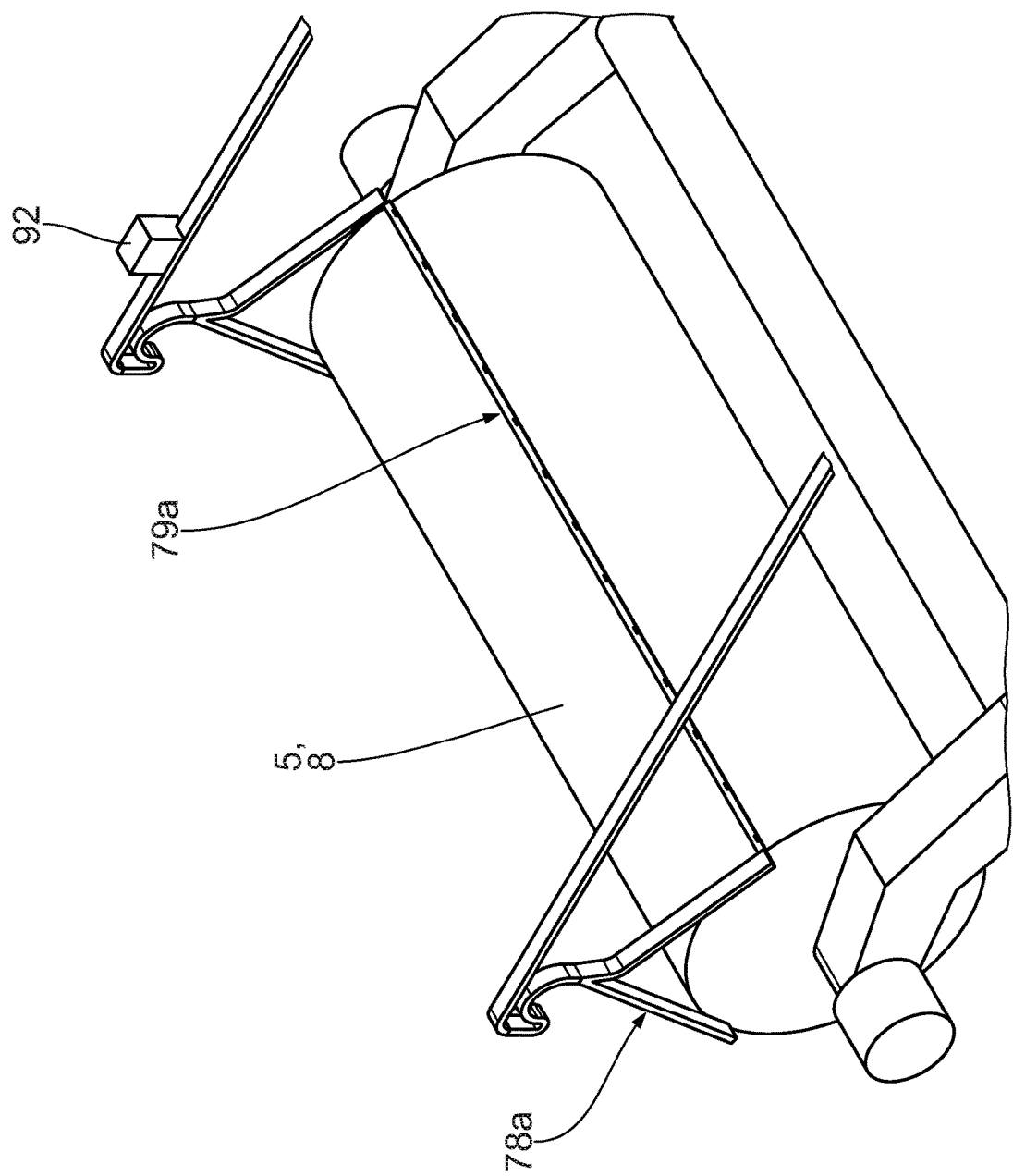
FIG. 15 shows a perspective view of a material roll arranged in the material web splicing arrangement, together with entrance-side guide devices according to a second embodiment.
Figure 16:
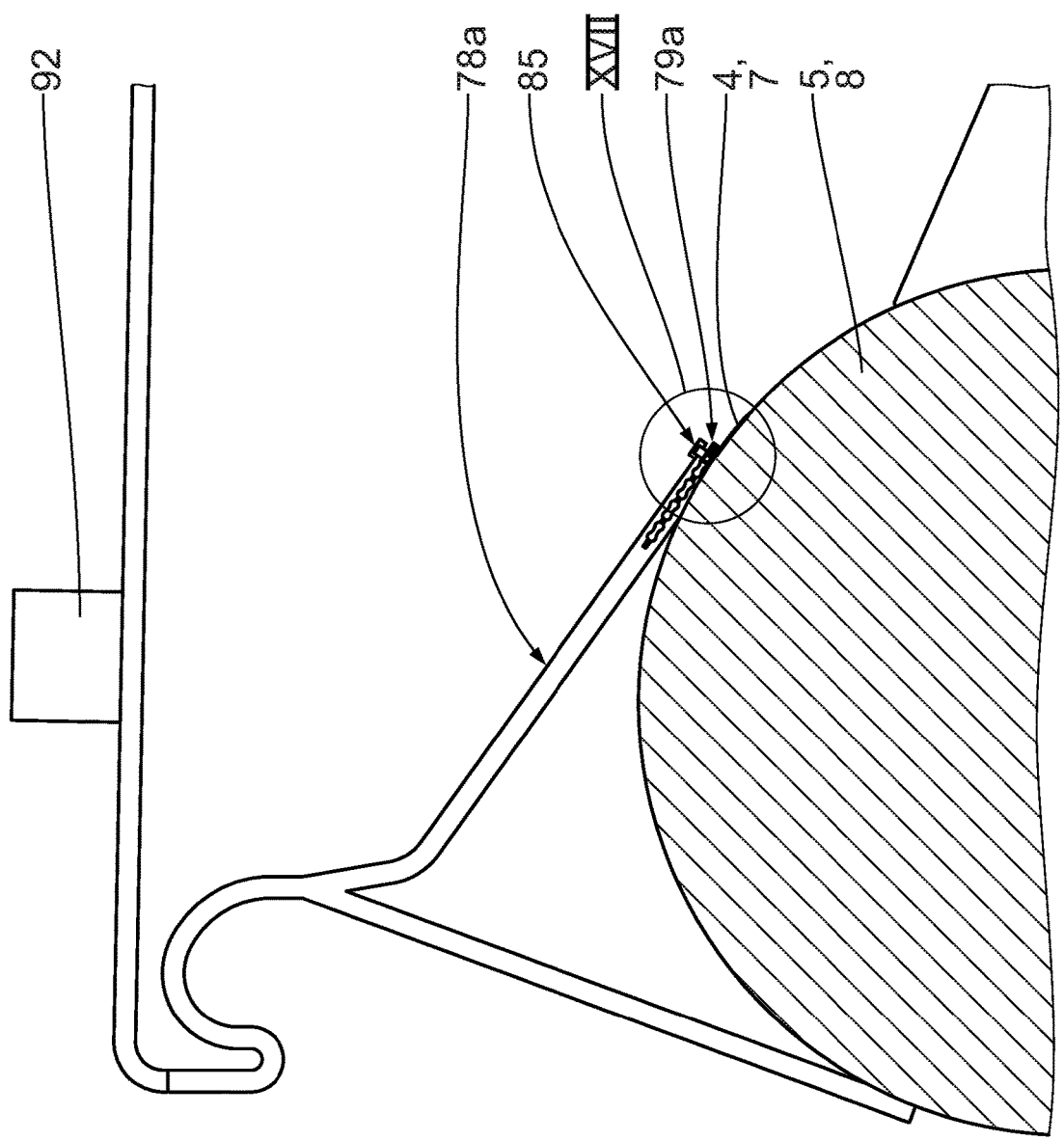
FIG. 16 shows a partial side view of the arrangement shown in FIG. 15.
Figure 17:
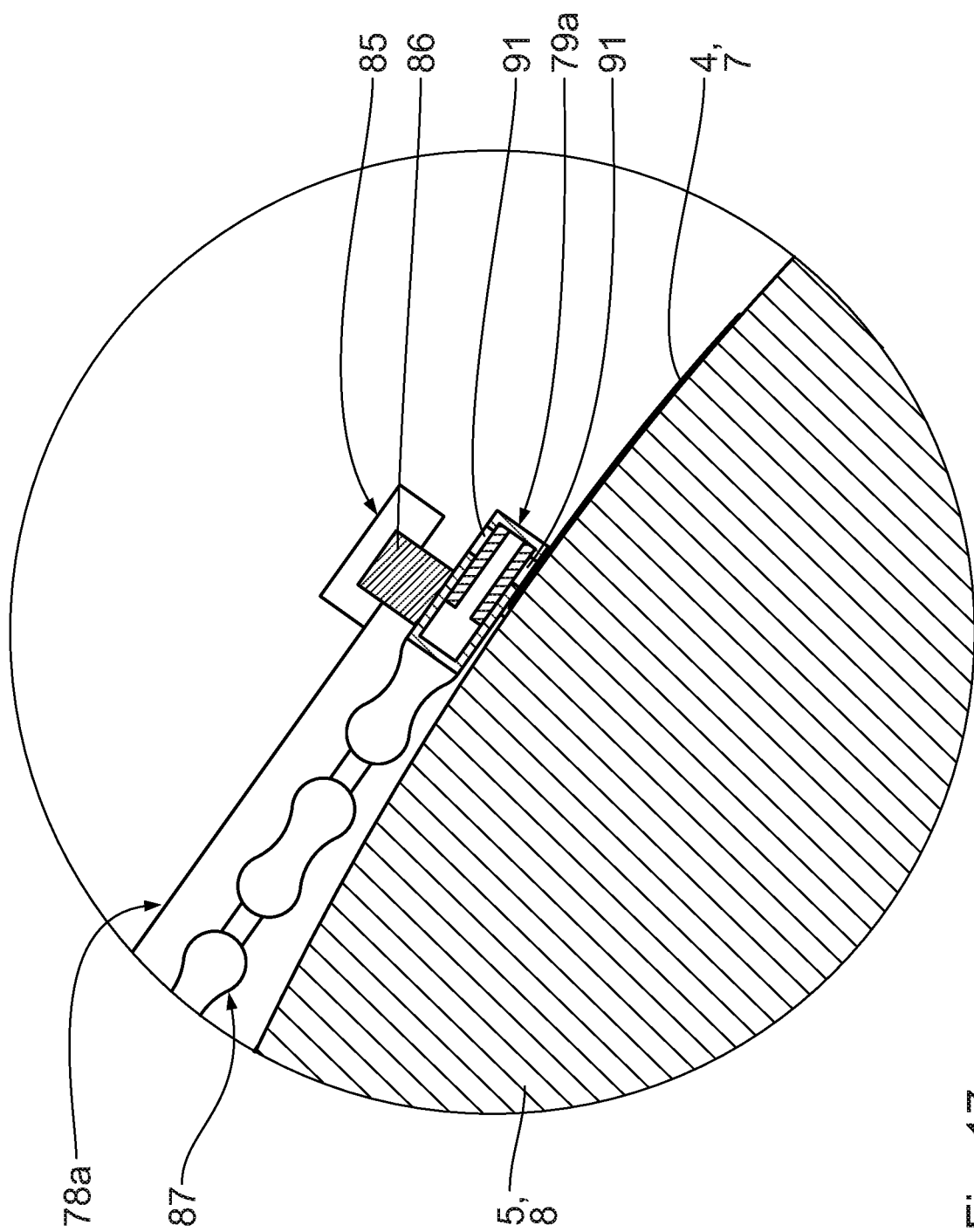
FIG. 17 shows the detail indicated in FIG. 16 on an enlarged scale, wherein the material web suctioning device is inactive.

As shown in FIG. 9, for a splicing process substantially analogous to the description above, a splicing piece 89 arranged on the finite first material web 4 is adhesively connected to the endless material web 3 or finite second material web 7, such that the finite first material web 4 is adhesively connected to the endless material web 3. The feed of the finite second material web 7 is then stopped.

The first exit 56 of the entrance-side first guide apparatus 50 and the first entrance 58 of the first guide arc device 57 has been arranged adjacent to one another, such that the finite first material web 4 is, during the drawing-in process, capable of passing from the entrance-side first guide apparatus 50 into the first guide arc device 57. The first exit end 59 of the first guide arc device 57 and the first connection 61 of the substantially rectilinear first guide device 60 have been arranged adjacent to one another, such that the finite first material web 7 is, during the drawing-in process, capable of passing from the first guide arc device 57 into the substantially rectilinear first guide device 60. The first preparation device 20 together with the first guide arc device 57 have, for this purpose, been correspondingly displaced along the guide 24.

If the material web splicing arrangement 1 is already in operation and a material web 3, 4 is being unrolled or conveyed, the new finite material web 4 or 7 is, as described, guided by means of the material web drawing-in apparatus only as far as the respective transport drum 27 or 28.

By contrast, if no material web is yet situated in the material web splicing arrangement 1, the respective finite material web 4 or 7 can, by means of the material web drawing-in apparatus, be drawn fully into the material web splicing arrangement 1 as far as the material web exit 44 thereof or as far as an adjacently arranged production arrangement or apparatus.

The first exit 56 of the entrance-side first guide apparatus 50 and the first entrance 58 of the first guide arc device 57 have then been arranged adjacent to one another such that the finite first material web 4 is, during the drawing-in process, capable of passing from the entrance-side first guide apparatus 50 into the first guide arc device 57. The first exit end 59 of the first guide arc device 57 and the first connection 61 of the substantially rectilinear first guide device 60 have been arranged adjacent to one another, such that the finite first material web 7 is, during the drawing-in process, capable of passing from the first guide arc device 57 into the substantially rectilinear first guide device 60. The first preparation device 20 together with the first guide arc device 57 have, for this purpose, been correspondingly displaced along the guide 24. Alternatively, the second exit 69 of the entrance-side second guide apparatus 63 and the second entrance of the second guide arc device 70 are arranged adjacent to one another, such that the finite second material web 7 is, during the drawing-in process, capable of passing from the entrance-side second guide apparatus 63 into the second guide arc device 70. The second exit end 72 of the second guide arc device 70 and the second connection 74 of the substantially rectilinear second guide device 73 have been arranged adjacent to one another, such that the finite second material web 7 is, during the drawing-in process, capable of passing from the second guide arc device 70 into the substantially rectilinear second guide device 73. The second preparation device 20 together with the second guide arc device 70 have, for this purpose, been correspondingly displaced along the guide 24.

The coupling chains 87 are drawn in synchronously by motor means, such that the transverse member 79 together with the fixed finite second material web 7 is pulled along the slotted guide 49 as far as the material web exit 44 or beyond the latter.

The material web clamping device 78 is displaced preferably in automated fashion or by motor means into its initial position for receiving the respective finite material web 4 or 7. To receive the respective finite material web 4 or 7, the holding bar 82 engages under the respective finite material web 4 or 7. For this purpose, a free portion, which is to be received, of the respective finite material web 4 or 7 has been arranged spaced apart from material web portions, arranged therebelow, of the respective material roll 5 or 8. The material web 4, 7 extends through the material web receiving opening 80.

When a correct position of the transverse member 79 in relation to the finite material web 4, 7 or the end thereof is attained, the material web detection element outputs a corresponding electrical triggering signal which effects a, preferably motor-driven, displacement of the clamping beam 84 into its clamping position. The correct position of the transverse member 79 in relation to the finite material web 4, 7 or the end thereof is preferably attainable because the material web splicing arrangement 1 receives the material roll 5, 8 in an oriented or exactly defined initial situation, and thus already knows where the end of the respective material web 4, 7 is situated on the material roll 5, 8. Subsequently, the transverse member 79 is displaced into its desired position by means of the coupling chains 87, with the respective finite material web 4 or 7 being drawn in. Fully automated receiving of the material roll 5, 8 is possible. Fully automated drawing-in of the material web 4, 7 is likewise possible.

The activation or actuation of the individual units, such as preparation devices 19, 20, connecting devices 21, 22, material web drawing-in apparatus and/or release liner removal apparatus, is performed preferably by means of at least one corresponding electrical or electronic actuation or control unit.

The endless material web 3 is fed together with a further endless material web to a corrugated cardboard production apparatus for the purposes of producing a corrugated cardboard web which is laminated on one side. To generate a corrugated web, which has a corrugation, from one of the endless material webs, said corrugated cardboard production apparatus has a corrugated device with drums. For the connection of the corrugated web to a smooth web composed of the other endless material web, the corrugated cardboard production apparatus has a glue application device which applies glue to tips of the corrugation of the corrugated web. To press the smooth web against the corrugated web that has been provided with glue, the corrugated cardboard production apparatus has a pressing module, wherein the corrugated cardboard web laminated on one side is formed from the corrugated web and the smooth web. A reversed use of the material webs is alternatively possible.

A second embodiment of the material web holding device will be described below with reference to FIGS. 15 to 18. Identical parts are denoted by the same reference designations as in the embodiment above, to the description of which reference is hereby explicitly made. Parts which differ in terms of construction but which are of identical function are denoted by the same reference designations with the suffix "a".

By contrast to the preceding embodiment, the material web holding device is in this case designed not as a material web clamping device 78 but as a material web suctioning device 78a. The material web suctioning device 78a has a transverse member 79a which substantially encloses an interior space and which is designed for example as a rectangular profile body. In the transverse member 79a, there are formed mutually oppositely situated flow openings 91.

The transverse member 79a is connected in terms of flow to a suction source 92. In the active state of the suction source 92, the material web 4, 7 to be drawn in is suctioned onto the transverse member 79a and lies firmly against the latter in the region of the flow openings 91, which are adjacent to the material web 4, 7 to be drawn in.

The function of the material web suctioning device 78a or of the corresponding material web drawing-in apparatus is substantially analogous to that in the case of the material web clamping device 78.

The expressions "upstream", "downstream", "entrance-side", "exit-side" or the like used here relate in particular to a conveying direction of an associated material web.

What is claimed is:

1. A release liner removal apparatus, comprising:
   at least one release liner removal device for removing at least one release liner from at least one adhesive piece arranged on a material web, wherein the at least one release liner removal device is designed as a negative-pressure body;
   at least one support body which supports the at least one release liner removal device; and
   at least one guide body which is arranged adjacent to the at least one release liner removal device at least during the removal of the at least one release liner and which serves for guiding the material web.

2. The release liner removal apparatus according to claim 1, wherein the at least one release liner removal device and the at least one guide body are displaceable relative to one another between a mutually adjacent release liner removal position, for removing the at least one release liner from the at least one adhesive piece, and an inactive rest position.

3. The release liner removal apparatus according to claim 1, wherein the negative-pressure body is displaceable.

4. The release liner removal apparatus according to claim 1, wherein the at least one guide body is designed as a negative-pressure body.

5. The release liner removal apparatus according to claim 1, wherein the at least one guide body is displaceable.

6. A material web working/processing arrangement, comprising:
   at least one release liner removal apparatus, comprising:
      at least one release liner removal device for removing at least one release liner from at least one adhesive piece arranged on a material web, wherein the at least one release liner removal device is designed as a negative-pressure body;
      at least one support body which supports the at least one release liner removal device; and
      at least one guide body which is arranged adjacent to the at least one release liner removal device at least during the removal of the at least one release liner and which serves for guiding the material web.

7. The material web working/processing arrangement according to claim 6, wherein it is designed as a material web unrolling arrangement.

8. The material web working/processing arrangement according to claim 6, wherein at least one guide for guiding at least one material web holding device from at least one material web drawing-in point to at least one material web transfer point for the preparation of a material web to be worked/processed runs at least between the at least one material web drawing-in point and a preparation device of the material web working/processing arrangement.

9. The material web working/processing arrangement according to claim 8, wherein the material web is guidable to the preparation device.

10. The material web working/processing arrangement according to claim 9, wherein the preparation device is capable of receiving the material web for further processing.

11. A plant comprising:
    at least one material web working/processing arrangement according to claim 6; and
    at least one material roll preparation arrangement for preparing a material roll carrying the material web to be drawn in.

12. The plant according to claim 11, wherein the at least one material web working/processing arrangement is designed as a material web unrolling arrangement.

13. The plant according to claim 11, wherein the at least one material roll preparation arrangement has at least one material roll circumferential direction orientation apparatus for orienting the material roll in a circumferential direction thereof.

14. The plant according to claim 13, wherein the at least one material web working/processing arrangement receives the material roll in a position oriented by means of the at least one material roll circumferential direction orientation apparatus.

15. The plant according to claim 13, wherein the at least one material web working/processing arrangement receives the material roll in a position oriented by means of the at least one material roll circumferential direction orientation apparatus for a defined initial situation.

16. The plant according to claim 11, wherein the at least one material roll preparation arrangement has at least one material roll circumferential direction orientation apparatus for orienting the material roll into a defined initial situation.

17. The plant according to claim 11, wherein the at least one material web working/processing arrangement is capable of receiving the material roll in automated fashion.

18. A plant comprising:
at least one material roll preparation arrangement for bringing a material carrying a material web to be drawn in into a defined initial situation, and
at least one material web working/processing arrangement according to claim 6, which is capable, owing to the defined initial situation of the material roll, of at least one of receiving the material roll in automated fashion and receiving the material web in automated fashion and preparing the material web in automated fashion.

19. The plant according to claim 18, wherein the at least one material web working/processing arrangement is designed as a material web unrolling arrangement.

20. A method for removing at least one release liner, the method comprising;
removing at least one release liner from at least one adhesive piece arranged on a material web by means of at least one release liner removal device which is supported by at least one support body; and
guiding the material web by means of at least one guide body which is arranged adjacent to the at least one release liner removal device at least during the removal of the at least one release liner, wherein, for a removal of the at least one release liner, a negative-pressure drum that forms a release liner removal device and a transport drum that forms a guide body are arranged adjacent to one another.

21. The method according to claim 20, wherein, for a removal of the at least one release liner, the negative-pressure drum and the transport drum are driven in opposite directions such that the material web is conveyed back counter to its actual drawing-in direction, and the at least one adhesive piece arranged at an end on the material web arrives between a gap formed by the negative-pressure drum and the transport drum.

22. The method according to claim 21, wherein, for a removal of the at least one release liner, the at least one adhesive piece, in the gap, faces with its at least one release towards the negative-pressure drum.

23. The method according to claim 22, wherein, for a removal of the at least one release liner, the negative-pressure drum is active and, by means of its generated negative pressure, suctions the at least one release liner and thus removes said release liner from the at least one adhesive piece so as to expose an outer adhesive surface, situated opposite an inner adhesive surface, of the at least one adhesive piece.

24. A material web working/processing arrangement, comprising:
at least one release liner removal apparatus comprising at least one release liner removal device for removing at least one release liner from at least one adhesive piece arranged on a material web, said at least one release liner removal device being configured as a negative-pressure body, wherein said material web working/processing arrangement is designed such that a connection between one finite material web and a further finite material web so as to form a continuous material web is preparable in automated fashion owing to a defined initial situation of the material web to be drawn in or of an end thereof.

25. The material web working/processing arrangement according to claim 24, wherein it is designed as a material web unrolling arrangement.

26. A release liner removal apparatus, comprising:
at least one release liner removal device for removing at least one release liner from at least one adhesive piece arranged on a material;
at least one support body which supports the at least one release liner removal device; and
at least one guide body which is arranged adjacent to the at least one release liner removal device at least during the removal of the at least one release liner and which serves for guiding the material web, wherein the at least one guide body is designed as a negative-pressure body.

* * * * *

UNITED STATES PATENT AND TRADEMARK OFFICE
CERTIFICATE OF CORRECTION

| | | |
|---|---|---|
| PATENT NO. | : 11,548,747 B2 | |
| APPLICATION NO. | : 16/783362 | |
| DATED | : January 10, 2023 | |
| INVENTOR(S) | : Karl Ruhland, Alfons Gnan and Norbert Städele | |

It is certified that error appears in the above-identified patent and that said Letters Patent is hereby corrected as shown below:

On the Title Page

(73) Assignee should read: BHS Corrugated Maschinen- und Anlagenbau GmbH WEIHERHAMMER (DE)

Signed and Sealed this
Seventh Day of May, 2024

Katherine Kelly Vidal
*Director of the United States Patent and Trademark Office*